US012503556B2

(12) United States Patent
Vogel et al.

(10) Patent No.: US 12,503,556 B2
(45) Date of Patent: Dec. 23, 2025

(54) SILICONE-ACRYLATE POLYMERS, COPOLYMERS, AND RELATED METHODS AND COMPOSITIONS

(71) Applicants: DOW SILICONES CORPORATION, Midland, MI (US); DOW GLOBAL TECHNOLOGIES LLC, Midland, MI (US)

(72) Inventors: Erin B. Vogel, Midland, MI (US); Ray E. Drumright, Midland, MI (US); Richard Cooper, Midland, MI (US); Jodi M. Mecca, Midland, MI (US); Kangsang Lee, Midland, MI (US); Myoungbae Lee, Midland, MI (US); Matthew Jeletic, Midland, MI (US); Dongchan Ahn, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 654 days.

(21) Appl. No.: 17/793,845

(22) PCT Filed: Jan. 21, 2021

(86) PCT No.: PCT/US2021/014291
§ 371 (c)(1),
(2) Date: Jul. 19, 2022

(87) PCT Pub. No.: WO2021/150667
PCT Pub. Date: Jul. 29, 2021

(65) Prior Publication Data
US 2023/0093828 A1    Mar. 30, 2023

Related U.S. Application Data

(60) Provisional application No. 62/964,445, filed on Jan. 22, 2020.

(51) Int. Cl.
*C08G 77/388*    (2006.01)
(52) U.S. Cl.
CPC .................................. *C08G 77/388* (2013.01)
(58) Field of Classification Search
None
See application file for complete search history.

(56) References Cited

U.S. PATENT DOCUMENTS

| | | |
|---|---|---|
| 3,398,017 A | 8/1968 | Baurain et al. |
| 4,481,049 A | 11/1984 | Reichmanis et al. |
| 4,589,999 A | 5/1986 | Vasta |
| 4,680,364 A | 7/1987 | Lucas |
| 4,988,788 A | 1/1991 | Takarada |
| 5,234,736 A | 8/1993 | Lee |
| 5,605,745 A | 2/1997 | Recker et al. |
| 5,993,923 A | 11/1999 | Lee |
| 5,998,498 A | 12/1999 | Vanderlaan et al. |
| 6,268,440 B1 | 7/2001 | Kudo et al. |
| 6,312,621 B1 | 11/2001 | Pedigo et al. |
| 6,458,878 B1 | 10/2002 | Tsuboi et al. |
| 6,734,569 B2 | 5/2004 | Appelt et al. |
| 6,939,922 B2 | 9/2005 | Beckley et al. |
| 7,151,154 B2 | 12/2006 | Killeen et al. |
| 7,955,696 B2 | 6/2011 | Baikerikar et al. |
| 7,960,465 B2 | 6/2011 | Rathore et al. |
| 8,263,720 B1 | 9/2012 | Salamone et al. |
| 8,986,725 B2 | 3/2015 | Stabler et al. |
| 9,441,086 B2 | 9/2016 | Albaugh et al. |

(Continued)

FOREIGN PATENT DOCUMENTS

| | | |
|---|---|---|
| CA | 1315440 C | 3/1993 |
| CN | 1258687 A | 7/2000 |

(Continued)

OTHER PUBLICATIONS

English Machine Translation of Tanaka et al. (JP2007314758) (Year: 2007).*
Machine assisted English translation of CN106995530A obtained from https://worldwide.espacenet.com/patent on Jun. 22, 2023, 21 pages.
International Search Report for PCT/US2021/014292 dated Apr. 30, 2021, 5 pages.
Machine assisted English translation of CN1974581A obtained from https://patents.google.com/patent on Oct. 18, 2022, 12 pages.
Machine assisted English translation of CN110591019A obtained from https://patents.google.com/patent on Nov. 3, 2022, 14 pages.

(Continued)

*Primary Examiner* — Randy P Gulakowski
*Assistant Examiner* — Holley Grace Hester
(74) *Attorney, Agent, or Firm* — Warner Norcross + Judd LLP

(57) ABSTRACT

A curable composition is disclosed. The curable composition comprises (I) an epoxide-functional silicone-acrylate polymer and (II) an aminosiloxane. The epoxide-functional silicone-acrylate polymer comprises acrylate-derived monomeric units comprising siloxane moieties, epoxide-functional moieties, and optionally, hydrocarbyl moieties, and the aminosiloxane comprises an average of at least two amine functional groups per molecule. A method of preparing the curable composition is also disclosed, and includes reacting (A) an acryloxy-functional organosilicon component, (B) an epoxy-functional acrylate component, and optionally (C) an acrylate component, to give the epoxide-functional silicone-acrylate polymer (I), and combining the epoxide-functional silicone-acrylate polymer (I) with the aminosiloxane (II). An aminosiloxane-silicone-acrylate copolymer prepared with the composition, a cured product comprising the same, and methods of preparing the same, are also disclosed.

20 Claims, No Drawings

(56) References Cited

U.S. PATENT DOCUMENTS

| | | | |
|---|---|---|---|
| 2003/0236376 A1* | 12/2003 | Kindt-Larsen | C08F 20/28 526/320 |
| 2006/0012750 A1 | 1/2006 | Nakamura et al. | |
| 2007/0135602 A1 | 6/2007 | Yamahiro et al. | |
| 2007/0212556 A1 | 9/2007 | Musa et al. | |
| 2010/0041822 A1 | 2/2010 | Hashemzadeh | |
| 2011/0046294 A1 | 2/2011 | Minge et al. | |
| 2011/0133350 A1 | 6/2011 | Qiu et al. | |
| 2011/0140292 A1 | 6/2011 | Chang et al. | |
| 2011/0166248 A1 | 7/2011 | Hsu et al. | |
| 2012/0115979 A1 | 5/2012 | Chang et al. | |
| 2012/0139138 A1 | 6/2012 | Samuel et al. | |
| 2012/0202916 A1 | 8/2012 | Laredo et al. | |
| 2012/0214898 A1 | 8/2012 | Lee et al. | |
| 2012/0214899 A1 | 8/2012 | Lee et al. | |
| 2012/0245272 A1 | 9/2012 | Dent et al. | |
| 2013/0046043 A1 | 2/2013 | Higgs et al. | |
| 2014/0060324 A1* | 3/2014 | Ahn | B01D 71/701 96/10 |
| 2015/0131033 A1 | 5/2015 | Min et al. | |
| 2015/0225601 A1 | 8/2015 | Komatsu et al. | |
| 2015/0251364 A1 | 9/2015 | Bothe et al. | |
| 2015/0378282 A1 | 12/2015 | Honya et al. | |
| 2016/0032060 A1 | 2/2016 | Jiang et al. | |
| 2017/0174840 A1 | 6/2017 | Dinkar | |
| 2018/0044551 A1 | 2/2018 | Ogawa et al. | |
| 2021/0253900 A1 | 8/2021 | Vogel et al. | |
| 2021/0261818 A1 | 8/2021 | Piwowar et al. | |

FOREIGN PATENT DOCUMENTS

| | | |
|---|---|---|
| CN | 1407044 A | 4/2003 |
| CN | 1974581 A | 6/2007 |
| CN | 102675561 A | 9/2012 |
| CN | 102675658 A | 9/2012 |
| CN | 104968751 A | 10/2015 |
| CN | 105278294 A | 1/2016 |
| CN | 106995530 A | 8/2017 |
| CN | 110501019 A | 12/2019 |
| EP | 0342027 A2 | 11/1989 |
| EP | 0461270 A1 | 12/1991 |
| EP | 0617333 A2 | 9/1994 |
| GB | 2119951 A | 11/1983 |
| GB | 2222595 A | 3/1990 |
| JP | S561060 A | 1/1981 |
| JP | S6173706 A | 4/1986 |
| JP | S61109756 A | 5/1986 |
| JP | S61111308 A | 5/1986 |
| JP | S61123609 A | 6/1986 |
| JP | S61197609 A | 9/1986 |
| JP | S61246277 A | 11/1986 |
| JP | S63159820 A | 7/1988 |
| JP | S63163811 A | 7/1988 |
| JP | S63168469 A | 7/1988 |
| JP | S63301919 A | 12/1988 |
| JP | H02135132 A | 5/1990 |
| JP | H02145665 A | 6/1990 |
| JP | H02247186 A | 10/1990 |
| JP | H04140711 A | 5/1992 |
| JP | H04174545 A | 6/1992 |
| JP | H05269181 A | 10/1993 |
| JP | H10310677 A | 11/1998 |
| JP | H11279259 A | 10/1999 |
| JP | 2000212478 A | 8/2000 |
| JP | 2005336219 A | 12/2005 |
| JP | 2006257318 A | 9/2006 |
| JP | 2007191703 A | 8/2007 |
| JP | 2007314758 A * | 12/2007 |
| JP | 2008050549 A | 3/2008 |
| JP | 2009256553 A | 11/2009 |
| JP | 2011190303 A | 9/2011 |
| JP | 2011221256 A | 11/2011 |
| JP | 5076256 B2 | 11/2012 |
| JP | 2013122040 A | 6/2013 |
| JP | 2014517083 A | 7/2014 |
| JP | 2018024828 A | 2/2018 |
| JP | 2018070742 A | 5/2018 |
| KR | 20130097489 A | 9/2013 |
| KR | 101422441 B1 | 7/2014 |
| KR | 20140104174 A | 8/2014 |
| NZ | 584498 A | 10/2010 |
| WO | 1991010155 A1 | 7/1991 |
| WO | 2012016097 A2 | 2/2012 |
| WO | 2012128752 A1 | 9/2012 |
| WO | 2013052276 A1 | 4/2013 |
| WO | 2013110911 A1 | 8/2013 |
| WO | 2014042389 A1 | 3/2014 |
| WO | 2014064444 A1 | 5/2014 |
| WO | 2016164292 A1 | 10/2016 |
| WO | 2020010564 A1 | 1/2020 |
| WO | 2021113042 A1 | 6/2021 |
| WO | 2021113043 A1 | 6/2021 |

OTHER PUBLICATIONS

Machine assisted English translation of JPH05269181A obtained from https://patents.google.com/patent on Oct. 18, 2022, 17 pages.
Machine assisted English translation of JPH04140711A obtained from https://worldwide.espacenet.com/patent on Oct. 18, 2022, 4 pages.
Machine assisted English translation of JPH02247186A obtained from https://worldwide.espacenet.com/patent on Oct. 18, 2022, 4 pages.
Machine assisted English translation of JPH02135132A obtained from https://worldwide.espacenet.com/patent on Oct. 18, 2022, 5 pages.
Machine assisted English translation of JPH02145665A obtained from https://worldwide.espacenet.com/patent on Oct. 18, 2022, 5 pages.
Machine assisted English translation of JPS63301919A obtained from https://worldwide.espacenet.com/patent on Oct. 18, 2022, 6 pages.
Machine assisted English translation of JPS63159820A obtained from https://worldwide.espacenet.com/patent on Oct. 18, 2022, 6 pages.
Machine assisted English translation of JPS63163811A obtained from https://worldwide.espacenet.com/patent on Oct. 18, 2022, 6 pages.
Machine assisted English translation of JPS61197609A obtained from https://worldwide.espacenet.com/patent on Oct. 18, 2022, 6 pages.
Machine assisted English translation of JPS61123609A obtained from https://worldwide.espacenet.com/patent on Oct. 18, 2022, 6 pages.
Machine assisted English translation of JPS61109756A obtained from https://worldwide.espacenet.com/patent on Oct. 18, 2022, 5 pages.
Machine assisted English translation of JPS61111308A obtained from https://worldwide.espacenet.com/patent on Oct. 19, 2022, 6 pages.
Machine assisted English translation of JPS6173706A obtained from https://worldwide.espacenet.com/patent on Oct. 19, 2022, 6 pages.
Machine assisted English translation of JPS561060A obtained from https://worldwide.espacenet.com/patent on Oct. 19, 2022, 4 pages.
Machine assisted English translation of KR20140104174A obtained from https://patents.google.com/patent on Oct. 19, 2022, 14 pages.
Machine assisted English translation of WO2014042389A1 obtained from https://patents.google.com/patent on Oct. 19, 2022, 50 pages.
Machine assisted English translation of KR20130097489A obtained from https://patents.google.com/patent on Oct. 19, 2022, 12 pages.
Machine assisted English translation of CN102675561A obtained from https://patents.google.com/patent on Oct. 19, 2022, 11 pages.
Machine assisted English translation of CN102675658A obtained from https://patents.google.com/patent on Oct. 19, 2022, 12 pages.
Machine assisted English translation of JP2011190303A obtained from https://patents.google.com/patent on Oct. 19, 2022, 12 pages.

(56) References Cited

OTHER PUBLICATIONS

Machine assisted English translation of JP2011221256A obtained from htttps://patents.google.com/patent on Oct. 19, 2022, 12 pages.
International Search Report for PCT/US2021/014291 dated May 10, 2021, 4 pages.
International Search Report for PCT/US2021/014290 dated May 7, 2021, 4 pages.
Machine assisted English translation of JP2000212478A obtained from <https://patents.google.com/patent> on Dec. 5, 2024, 4 pages.
Machine assisted English translation of JPH11279259A obtained from https://patents.google.com/patent on Dec. 5, 2024, 7 pages.
Machine assisted English translation of JP2013122040A obtained from https://patents.google.com/patent on Dec. 5, 2024, 18 pages.
Machine assisted English translation of JP2018070742A obtained from https://patents.google.com/patent on Dec. 5, 2024, 11 pages.
Machine assisted English translation of JP2007191703A obtained from https://patents.google.com/patent on Dec. 5, 2024, 10 pages.
Machine assisted English translation of JP2006257318A obtained from https://patents.google.com/patent on Dec. 5, 2024, 12 pages.
Machine assisted English translation of JPH10310677A obtained from https://patents.google.com/patent on Dec. 5, 2024, 8 pages.
Machine assisted English translation of JPH04174545A obtained from https://patents.google.com/patent on Dec. 5, 2024, 10 pages.
Machine assisted English translation of JP2005336219A obtained from https://patents.google.com/patent on Dec. 5, 2024, 9 pages.
Langmuir, May 31, 2017, Thomas Edward Kodger et al., Stable fluorescent PMMA particles for longterm observation of slow colloidal dynamics.
Riffle, J.S., et al., "Elastomeric Polysiloxane Modifiers for Epoxy Networks, Synthesis of Functional Oligomers and Network Formation Studies", American Chemical Society, Mar. 2, 1983.

* cited by examiner

SILICONE-ACRYLATE POLYMERS, COPOLYMERS, AND RELATED METHODS AND COMPOSITIONS

CROSS-REFERENCE TO RELATED APPLICATIONS

This application is the U.S. National Stage of International Application No. PCT/US2021/014291 filed on 21 Jan. 2021, which claims priority to and all advantages of U.S. Provisional Patent Application No. 62/964,445 filed on 22 Jan. 2020, the content of which is incorporated herein by reference.

FIELD OF THE INVENTION

The present disclosure generally relates to siloxane-functionalized polymers and, more specifically, to compositions comprising a silicone-functionalized acrylate polymer, compounds and methods for preparing the same, and compositions, compounds and articles prepared therewith.

DESCRIPTION OF THE RELATED ART

Silicones are polymeric materials used in numerous commercial applications, primarily due to significant advantages they possess over their carbon-based analogues. More precisely called polymerized siloxanes or polysiloxanes, silicones have an inorganic silicon-oxygen backbone chain ( . . . —Si—O—Si—O—Si—O— . . . ) with organic side groups attached to the silicon atoms. Organic side groups may be used to link two or more of these backbones together. By varying the —Si—O— chain lengths, side groups, and crosslinking, silicones can be synthesized with a wide variety of properties and compositions, with silicone networks varying in consistency from liquid to gel to rubber to hard plastic.

Silicone and siloxane-based materials are known in the art and are utilized in myriad end use applications and environments. The most common silicone materials are based on the linear organopolysiloxane polydimethylsiloxane (PDMS), a silicone oil. Such organopolysiloxanes are utilized in numerous industrial, home care, and personal care formulations. The second largest group of silicone materials is based on silicone resins, which are formed with branched and cage-like oligosiloxanes. Unfortunately, the use of siloxane-based materials in certain applications that may benefit from particular inherent attributes of organopolysiloxanes (e.g. low-loss and stable optical transmission, thermal and oxidative stability, etc.) remains limited due to weak mechanical properties of conventional silicone networks, which may manifest in materials with poor or unsuitable characteristics such as low tensile strength, low tear strength, etc. Moreover, conventional silicone networks and carbon-based polymers are often incompatible and/or possess antagonistic properties with respect to one another.

BRIEF SUMMARY

A curable composition (the "composition") is provided. The composition comprises (I) an epoxide-functional silicone-acrylate polymer (the "silicone-acrylate polymer") and (II) an aminosiloxane comprising an average of at least two amine functional groups per molecule. The silicone-acrylate polymer has the following general average unit formula (I):

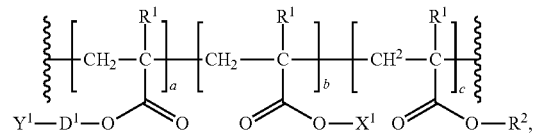

wherein: each $Y^1$ is an independently selected siloxane moiety; each $D^1$ is a divalent linking group; each $X^1$ is an independently selected epoxide-functional moiety; each $R^1$ is independently selected from H and $CH_3$; each $R^2$ is an independently selected substituted or unsubstituted hydrocarbyl group; subscript a≥1; subscript b≥1; subscript c≥0; and units indicated by subscripts a, b, and c may be in any order in the silicone-acrylate polymer.

A method of preparing the composition (the "preparation method") is also provided. The preparation method includes reacting (A) an acryloxy-functional organosilicon component, (B) an epoxy-functional acrylate component, and optionally (C) an acrylate component, to give the silicone-acrylate polymer (I). The preparation method also includes combining the silicone-acrylate polymer (I) and the aminosiloxane (II) to give the curable composition.

A method of preparing an aminosiloxane-silicone-acrylate copolymer (the "copolymer") with the composition (the "copolymerization method") is also provided. The copolymerization method comprises reacting together the silicone-acrylate polymer (I) and the aminosiloxane (II) to give the copolymer.

A cured product is also provided. The cured product comprises the copolymer prepared with the copolymerization method, and may be the product of curing the composition.

A composite article comprising the cured product and a substrate, and a method of forming the composite article, are also provided.

DETAILED DESCRIPTION OF THE INVENTION

A curable composition (the "composition") is provided. The curable composition comprises (I) an epoxide-functional silicone-acrylate polymer and (II) an aminosiloxane comprising an average of at least two amine functional groups per molecule. Beyond components (I) and (II), which are described in turn below, the composition is not particularly limited. The composition may be free from carrier vehicles, additives, reactants, and/or adjuvants, or, alternatively, may include one or more of such components, as also described below. The composition may be utilized in connection with diverse end-use applications, including in the preparation of functional materials suitable for use in or as composite materials, moldable optics, adhesives, etc.

Component (I) of the composition is an epoxide-functional silicone-acrylate polymer (i.e., the "silicone-acrylate polymer"). The silicone-acrylate polymer (I) generally comprises two or more monomeric units derived from acryloxy-functional monomers, and thus may be characterized, defined, or otherwise referred to as an acrylate or acrylic polymer or copolymer. However, as described below and illustrated by the examples herein, the silicone-acrylate polymer (I) may comprise functionality unrelated to acrylate/acryloxy-functional groups or monomers (e.g. other polymeric moieties, end-capping groups, etc.), but nonetheless may be simply described or referred to as an acrylate polymer, as will be understood by those of skill in the art. The silicone-acrylate polymer (I) is epoxide-functional, i.e., comprises at least one epoxide functional group, as will be understood in view of the description below), and thus may be reacted with compounds comprising epoxide-reactive functional groups such as amines (e.g. in a cross-linking reaction, etc.) and, in particular, with the aminosiloxane (II).

The silicone-acrylate polymer (I) has the following general average unit formula (I):

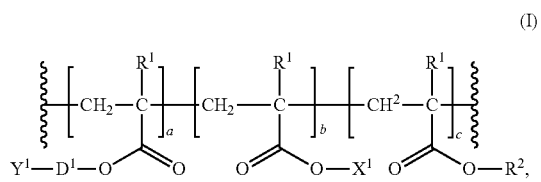

wherein: each $Y^1$ is an independently selected siloxane moiety; each $D^1$ is a divalent linking group; each $X^1$ is an independently selected epoxide-functional moiety; each $R^1$ is independently selected from H and $CH_3$; each $R^2$ is an independently selected substituted or unsubstituted hydrocarbyl group; subscript $a \geq 1$; subscript $b \geq 1$; subscript $c \geq 0$; and units indicated by subscripts a, b, and c may be in any order in the silicone-acrylate polymer (I).

With regard to formula (I), as introduce above, $Y^1$ represents a siloxane moiety. In general, the siloxane moiety $Y^1$ comprises a siloxane and is otherwise not particularly limited. As understood in the art, siloxanes comprise an inorganic silicon-oxygen-silicon group (i.e., —Si—O—Si—), with organosilicon and/or organic side groups attached to the silicon atoms. As such, siloxanes may be represented by the general formula $([R_fSiO_{(4-f)/2}]_e)_g(R)_{3-g}Si$—, where subscript f is independently selected from 1, 2, and 3 in each moiety indicated by subscript e, subscript e is at least 1, subscript g is 1, 2, or 3, and each R is independently selected from hydrocarbyl groups, alkoxy and/or aryloxy groups, and siloxy groups.

Hydrocarbyl groups suitable for R include monovalent hydrocarbon moieties, as well as derivatives and modifications thereof, which may independently be substituted or unsubstituted, linear, branched, cyclic, or combinations thereof, and saturated or unsaturated. With regard to such hydrocarbyl groups, the term "unsubstituted" describes hydrocarbon moieties composed of carbon and hydrogen atoms, i.e., without heteroatom substituents. The term "substituted" describes hydrocarbon moieties where either at least one hydrogen atom is replaced with an atom or group other than hydrogen (e.g. a halogen atom, an alkoxy group, an amine group, etc.) (i.e., as a pendant or terminal substituent), a carbon atom within a chain/backbone of the hydrocarbon is replaced with an atom other than carbon (e.g. a heteroatom, such as oxygen, sulfur, nitrogen, etc.) (i.e., as a part of the chain/backbone), or both. As such, suitable hydrocarbyl groups may comprise, or be, a hydrocarbon moiety having one or more substituents in and/or on (i.e., appended to and/or integral with) a carbon chain/backbone thereof, such that the hydrocarbon moiety may comprise, or be, an ether, an ester, etc. Linear and branched hydrocarbyl groups may independently be saturated or unsaturated and, when unsaturated, may be conjugated or nonconjugated. Cyclic hydrocarbyl groups may independently be monocyclic or polycyclic, and encompass cycloalkyl groups, aryl groups, and heterocycles, which may be aromatic, saturated and nonaromatic and/or non-conjugated, etc. Examples of combinations of linear and cyclic hydrocarbyl groups include alkaryl groups, aralkyl groups, etc. General examples of hydrocarbon moieties suitably for use in or as the hydrocarbyl group include alkyl groups, aryl groups, alkenyl groups, alkynyl groups, halocarbon groups, and the like, as well as derivatives, modifications, and combinations thereof. Examples of alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, and the like (i.e., other linear or branched saturated hydrocarbon groups, e.g. having greater than 6 carbon atoms). Examples of aryl groups include phenyl, tolyl, xylyl, naphthyl, benzyl, dimethyl phenyl, and the like, as well as derivatives and modifications thereof, which may overlap with alkaryl groups (e.g. benzyl) and aralkyl groups (e.g. tolyl, dimethyl phenyl, etc.). Examples of alkenyl groups include vinyl, allyl, propenyl, isopropenyl, butenyl, isobutenyl, pentenyl, heptenyl, hexenyl, cyclohexenyl groups, and the like, as well as derivatives and modifications thereof. General examples of halocarbon groups include halogenated derivatives of the hydrocarbon moieties above, such as halogenated alkyl groups (e.g. any of the alkyl groups described above, where one or more hydrogen atoms is replaced with a halogen atom such as F or Cl), aryl groups (e.g. any of the aryl groups described above, where one or more hydrogen atoms is replaced with a halogen atom such as F or Cl), and combinations thereof. Examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, 3,4-difluoro-5-methylcycloheptyl, chloromethyl, chloropropyl, 2-dichlorocyclopropyl, 2,3-dichlorocyclopentyl, and the like, as well as derivatives and modifications thereof. Examples of halogenated aryl groups include chlorobenzyl, pentafluorophenyl, fluorobenzyl groups, and the like, as well as derivatives and modifications thereof.

Alkoxy and aryloxy groups suitable for R include those having the general formula —$OR^i$, where $R^i$ is one of the hydrocarbyl groups set forth above with respect to R. Examples of alkoxy groups include methoxy, ethoxy, propoxy, butoxy, benzyloxy, and the like, as well as derivatives and modifications thereof. Examples of aryloxy groups include phenoxy, tolyloxy, pentafluorophenoxy, and the like, as well as derivatives and modifications thereof.

Examples of suitable siloxy groups suitable for R include [M], [D], [T], and [Q] units, which, as understood in the art, each represent structural units of individual functionality present in siloxanes, such as organosiloxanes and organopolysiloxanes. More specifically, [M] represents a monofunctional unit of general formula $R^{ii}_3SiO_{1/2}$; [D] represents a difunctional unit of general formula $R^{ii}_2SiO_{2/2}$; [T] represents a trifunctional unit of general formula $R^{ii}SiO_{3/2}$; and [Q] represents a tetrafunctional unit of general formula $SiO_{4/2}$, as shown by the general structural moieties below:

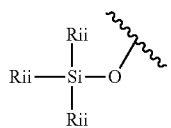

[M]

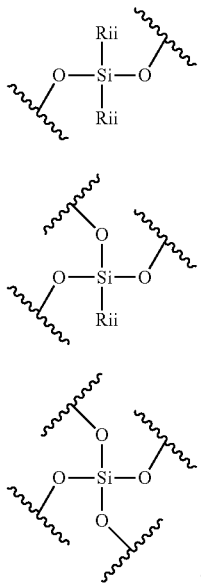

In these general structural moieties, each $R^{ii}$ is independently a monovalent or polyvalent substituent. As understood in the art, specific substituents suitable for each $R^{ii}$ are not limited, and may be monoatomic or polyatomic, organic or inorganic, linear or branched, substituted or unsubstituted, aromatic, aliphatic, saturated or unsaturated, and combinations thereof. Typically, each $R^{ii}$ is independently selected from hydrocarbyl groups, alkoxy and/or aryloxy groups, and siloxy groups. As such, each $R^{ii}$ may independently be a hydrocarbyl group of formula —$R^i$ or an alkoxy or aryloxy group of formula —$OR^i$, where $R^i$ is as defined above (e.g. including any of the hydrocarbyl groups set forth above with respect to R), or a siloxy group represented by any one, or combination, of [M], [D], [T], and/or [Q] units described above.

The siloxane moiety $Y^1$ may be linear, branched, or combinations thereof, e.g. based on the number and arrangement of [M], [D], [T], and/or [Q] siloxy units present therein. When branched, the siloxane moiety $Y^1$ may minimally branched or, alternatively, may be hyperbranched and/or dendritic.

In certain embodiments, the siloxane moiety $Y^1$ is a branched siloxane moiety having the general formula —Si$(R^3)_3$, wherein at least one $R^3$ is —OSi$(R^5)_3$ and each other $R^3$ is independently selected from $R^4$ and —OSi$(R^5)_3$. In such embodiments, each $R^5$ is independently selected from $R^4$, —OSi$(R^6)_3$, and —[—$D^2$—SiR$^4_2$]$_m$OSiR$^4_3$; where each $R^6$ is independently selected from $R^4$, —OSi$(R^7)_3$, and —[—$D^2$—SiR$^4_2$]$_m$OSiR$^4_3$; where each $R^7$ is independently selected from $R^4$ and —[—$D^2$—SiR$^4_2$]$_m$OSiR$^4_3$. In each selection, $R^4$ is an independently selected substituted or unsubstituted hydrocarbyl group, such as any of those described above with respect to R, $D^2$ is a divalent linking group individually selected in each moiety indicated by subscript m, and each subscript m is individually selected such that $0 \leq m \leq 100$ (i.e., in each selection where applicable).

In such branched siloxane moieties of $Y^1$, each divalent linking group $D^2$ is typically selected from oxygen (i.e., —O—) and divalent hydrocarbon groups. Examples of such hydrocarbon groups include divalent forms of the hydrocarbyl and hydrocarbon groups described above, such as any of those set forth above with respect to R. As such, it will be appreciated that suitable hydrocarbon groups for the divalent linking group $D^2$ may be substituted or unsubstituted, and linear, branched, and/or cyclic. Typically, however, when divalent linking group $D^2$ is a divalent hydrocarbon group, $D^2$ is selected from unsubstituted linear alkylene groups, such as ethylene, propylene, butylene, etc.

In certain embodiments, each divalent linking group $D^2$ is oxygen (i.e., —O—), such that each $R^5$ is independently selected from $R^4$, —OSi$(R^6)_3$, and —[OSiR$^4_2$]$_m$OSiR$^4_3$, each $R^6$ is independently selected from $R^4$, —OSi$(R^7)_3$, and —[OSiR$^4_2$]$_m$OSiR$^4_3$, and each $R^7$ is independently selected from $R^4$ and —[OSiR$^4_2$]$_m$OSiR$^4_3$, where each $R^4$ is as defined and described above and each subscript m is as defined above and described below.

As introduced above, each $R^3$ is selected from $R^4$ and —OSi$(R^5)_3$, with the proviso that at least one $R^3$ is of formula —OSi$(R^5)_3$. In certain embodiments, at least two $R^3$ are of formula —OSi$(R^5)_3$. In specific embodiments, each $R^3$ is of formula —OSi$(R^5)_3$. It will be appreciated that a greater number of $R^3$ being —OSi$(R^5)_3$ increases the level of branching in the siloxane moiety $Y^1$. For example, when each $R^3$ is —OSi$(R^5)_3$, the silicon atom to which each $R^3$ is bonded is a [T] siloxy unit. Alternatively, when but two $R^3$ are of formula —OSi$(R^5)_3$, the silicon atom to which each $R^3$ is bonded is a [D] siloxy unit. Moreover, when any $R^3$ is of formula —OSi$(R^5)_3$, where at least one of those $R^5$ is of formula —OSi$(R^6)_3$, further siloxane bonds and branching are present in the siloxane moiety $Y^1$. This is further the case when any $R^6$ is of formula —OSi$(R^7)_3$. As such, it will be understood by those of skill in the art that each subsequent $R^{5+n}$ moiety in the siloxane moiety $Y^1$ can impart a further generation of branching, depending on the particular selections thereof. For example, at least one $R^5$ can be of formula —OSi$(R^6)_3$, where at least one of those $R^6$ can be of formula —OSi$(R^7)_3$. Thus, depending on a selection of each substituent, further branching attributable to [T] and/or [Q] siloxy units may be present in the siloxane moiety $Y^1$ (i.e., beyond those of other substituents/moieties described above).

Each $R^5$ is independently selected from $R^4$, —OSi$(R^6)_3$, and —[—$D^2$—SiR$^4_2$]$_m$OSiR$^4_3$, where each $R^4$, $D^2$, and $R^6$ is as defined and described above and each subscript m is as defined above and described below. For example, when $D^2$ is oxygen (i.e., —O—), $R^5$ is selected from $R^4$, —OSi$(R^6)_3$, and —[OSiR$^4_2$]$_m$OSiR$^4_3$, where $0 \leq m \leq 100$. Depending on a selection of $R^5$ and $R^6$, further branching can be present in the siloxane moiety $Y^1$. For example, when each $R^5$ is $R^4$, then each —OSi$(R^5)_3$ moiety (i.e., each $R^3$ of formula —OSi$(R^5)_3$) is a terminal [M] siloxy unit. Said differently, when each $R^3$ is —OSi$(R^5)_3$ and each $R^5$ is $R^4$, then each $R^3$ can be written as —OSiR$^4_3$ (i.e., an [M] siloxy unit). In such embodiments, the siloxane moiety $Y^1$ includes a [T] siloxy unit bonded to group $D^1$ in formula (I), which [T] siloxy unit is capped by three [M] siloxy units. Moreover, when $R^5$ is of formula —[—$D^2$—SiR$^4_2$]$_m$OSiR$^4_3$, and $D^2$ is oxygen (i.e., —O—), the siloxane moiety $Y^1$ includes optional [D] siloxy units (i.e., those siloxy units in each moiety indicated by subscript m) as well as an [M] siloxy unit (i.e., represented by OSiR$^4_3$). As such, when each $R^3$ is of formula —OSi$(R^5)_3$, $R^5$ is of formula —[—$D^2$—SiR$^4_2$]$_m$OSiR$^4_3$, and each $D^2$ is oxygen (i.e., —O—), then each $R^3$ includes a [Q] siloxy unit. More specifically, in such embodiments, each $R^3$ is of formula —OSi([OSiR$^4_2$]$_m$OSiR$^4_3$)$_3$, such that when each subscript m is 0, each $R^3$ is a [Q] siloxy unit endcapped with three [M] siloxy units. Likewise, when subscript m is greater than 0, each $R^3$ includes a linear moiety (i.e., a diorganosiloxane moiety) with a degree of polymerization being attributable to subscript m.

As set forth above, each $R^5$ can also be of formula $—OSi(R^6)_3$. In embodiments where one or more $R^5$ is of formula $—OSi(R^6)_3$, further branching can be present in the siloxane moiety $Y^1$ depending a selection of $R^6$. More specifically, each $R^6$ is selected from $R^4$, $—OSi(R^7)_3$, and $—[—D^2—SiR^4{}_2]_mOSiR^4{}_3$, where each $R^7$ is selected from $R^4$ and $—[—D^2—SiR^4{}_2]_mOSiR^4{}_3$, and where each subscript m is defined above. For examples, in some embodiments, each $D^2$ is oxygen (i.e., $—O—$), such that each $R^6$ is selected from $R^4$, $—OSi(R^7)_3$, and $—[OSiR^4{}_2]_mOSiR^4{}_3$, where each $R^7$ is selected from $R^4$ and $—[OSiR^4{}_2]_mOSiR^4{}_3$, and where each subscript m is as defined above and described below.

As introduced above, with respect to the branched siloxane moiety of $Y^1$, subscript m is from (and including) 0 to 100, alternatively from 0 to 80, alternatively from 0 to 60, alternatively from 0 to 40, alternatively from 0 to 20, alternatively from 0 to 19, alternatively from 0 to 18, alternatively from 0 to 17, alternatively from 0 to 16, alternatively from 0 to 15, alternatively from 0 to 14, alternatively from 0 to 13, alternatively from 0 to 12, alternatively from 0 to 11, alternatively from 0 to 10, alternatively from 0 to 9, alternatively from 0 to 8, alternatively from 0 to 7, alternatively from 0 to 6, alternatively from 0 to 5, alternatively from 0 to 4, alternatively from 0 to 3, alternatively from 0 to 2, alternatively from 0 to 1, alternatively is 0. In certain embodiments, each subscript m is 0, such that the siloxane moiety $Y^1$ is free from [D] siloxy units. In particular embodiments, each subscript m is from 0 to 9, such that the siloxane moiety $Y^1$ is free from polysiloxane moieties having 10 or more repeating [D] siloxy units.

Importantly, each of $R^3$, $R^4$, $R^5$, $R^6$, and $R^7$ are independently selected. As such, the descriptions above relating to each of these substituents is not meant to mean or imply that each substituent is the same. Rather, any description above relating to $R^5$, for example, may relate to only one $R^5$ or any number of $R^5$ in the siloxane moiety $Y^1$, and so on. In addition, different selections of $R^3$, $R^4$, $R^5$, $R^6$, and $R^7$ can result in the same structures. For example, if a particular $R^3$ is $—OSi(R^5)_3$, wherein each $R^5$ is $—OSi(R^6)_3$, where each $R^6$ is $R^4$, then that particular $R^3$ can be written as $—OSi(OSiR^4{}_3)_3$. Similarly, if a specific $R^3$ is $—OSi(R^5)_3$, wherein each $R^5$ is $—[—D^2—SiR^4{}_2]_mOSiR^4{}_3$, where subscript m is 0, that specific $R^3$ can be written as $—OSi(OSiR^4{}_3)_3$. As shown, these particular selections result in the same final structure for $R^3$, based on different selections for $R^5$. To that end, any proviso of limitation on final structure of the siloxane moiety $Y^1$ is to be considered met by an alternative selection that results in the same structure required in the proviso.

In certain embodiments, each $R^4$ is an independently selected alkyl group. In some such embodiments, each $R^4$ is an independently selected alkyl group having from 1 to 10, alternatively from 1 to 8, alternatively from 1 to 6, alternatively from 1 to 4, alternatively from 1 to 3, alternatively from 1 to 2 carbon atom(s).

In particular embodiments, each subscript m is 0, and each $R^4$ is methyl, and the siloxane moiety $Y^1$ has one of the following structures (i)-(iv):

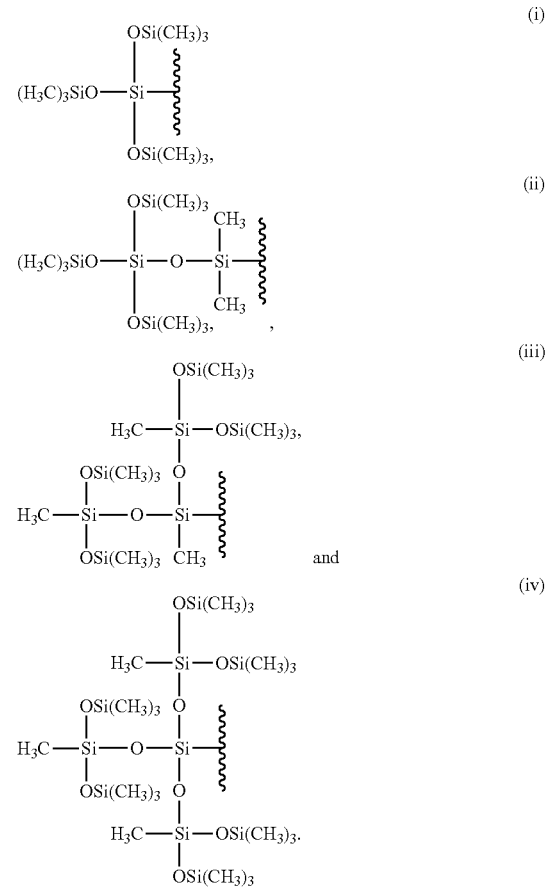

In certain embodiments, the siloxane moiety $Y^1$ is a linear siloxane moiety having the following general formula:

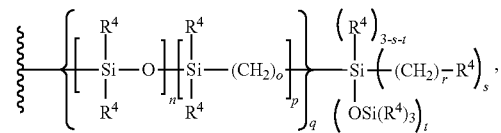

where $0 \leq n \leq 100$, subscript o is from 2 to 6, subscript p is 0 or 1, subscript q is 0 or 1, subscript r is from 0 to 9, subscript s is 0 or 1, subscript t is 0 or 2, s+t>0, and each $R^4$ is an independently selected and as defined above. For example, in some such embodiments, each $R^4$ is methyl, such that the siloxane moiety $Y^1$ is a linear siloxane moiety having the following general formula:

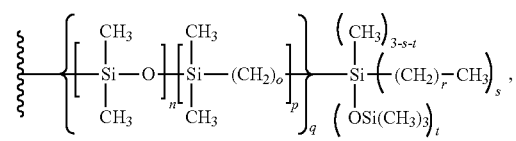

where subscripts n, o, p, q, r, s, and t are as defined above. However, it is to be appreciated that any $R^4$ may be selected from other hydrocarbyl groups, such as those described above.

In general, with respect to the linear siloxane moiety of $Y^1$, subscript n is equivalent to subscript m above, and thus represents a value of from (and including) 0 to 100. Likewise, subscript n may be from 0 to 80, such as from 0 to 60, alternatively from 0 to 40, alternatively from 0 to 20, alternatively from 0 to 19, alternatively from 0 to 18, alternatively from 0 to 17, alternatively from 0 to 16, alternatively from 0 to 15, alternatively from 0 to 14, alternatively from 0 to 13, alternatively from 0 to 12, alternatively from 0 to 11, alternatively from 0 to 10, alternatively from 0 to 9, alternatively from 0 to 8, alternatively from 0 to 7, alternatively from 0 to 6, alternatively from 0 to 5, alternatively from 0 to 4, alternatively from 0 to 3, alternatively from 0 to 2, alternatively from 0 to 1, alternatively is 0. In certain embodiments, subscript n is 0, such that the linear siloxane moiety $Y^1$ is free from [D] siloxy units in the segment indicated by subscript q (i.e., when q is 1). In other embodiments, however, subscript q is 1 and subscript n is 1, such that the segment of the linear siloxane moiety $Y^1$ indicated by subscript q comprises at least one [D] siloxy units. For example, in such embodiments, subscript n is from 1 to 100, such as from 5 to 100, alternatively from 5 to 90, alternatively from 5 to 80, alternatively from 5 to 70, alternatively from 7 to 70, such that the segment of the linear siloxane moiety $Y^1$ indicated by subscript q comprises a number of [D] siloxy units in one of those ranges. In particular embodiments, subscript n is from 0 to 9, such that the siloxane moiety $Y^1$ is free from polysiloxane moieties (i.e., the segment indicated by subscript q) having 10 or more repeating [D] siloxy units.

Subscript o is from 2 to 6, such that the segment indicated by subscript o is a $C_2$-$C_6$ alkylene group, such as an ethylene, propylene, butylene, pentylene, or hexylene group. Likewise, subscript r is from 0 to 9, and the segment indicated by subscript r, when r is 1, is a $C_1$-$C_9$ alkylene group, such as any of those described above with respect to subscript 0, or a heptylene, octylene, or nonylene group.

Subscripts s and t represent the substitution of the terminal silicon atom of the linear siloxane moiety $Y^1$. In general, at least one of subscripts s and t is >0 (i.e., s+t>0). For example, in certain embodiments, subscript s is 1 and subscript t is 0. In other embodiments, subscript s is 0 and subscript t is 2. In particular embodiments, the general formula of the linear siloxane moiety $Y^1$ above is subject to the proviso that subscript t is 0 when subscript s is 1, and subscript t is 2 when subscript s is 0.

In some embodiments, subscript q is 0, and subscript t is 2, such that $Y^1$ is an MD'M siloxane of general formula

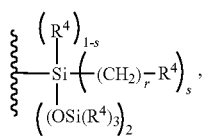

where each $R^4$, subscript r, and subscript s, is as defined above. One of skill in the art will recognize that, in such embodiments, different selections within the preceding general formula will achieve the same particular structure of the linear siloxane moiety $Y^1$. In particular, when subscript r is 0, the linear siloxane moiety $Y^1$ would be an MD'M siloxane of formula —Si(OSiR$^4_3$)$_2$(R$^4$) independent of the selection of subscript s as 0 or 1. For example, in certain embodiments, subscript q is 0, subscript r is 0, subscript t is 2, and each $R^4$ is methyl, such that $Y^1$ is an MD'M siloxane of formula:

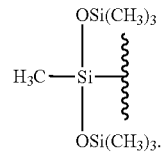

In particular embodiments, subscript p is 0, subscript q is 1, subscript s is 1, subscript t is 0, and each $R^4$ is methyl, such that $Y^1$ has the formula:

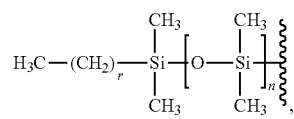

where subscripts n and r are as defined and described above. In some such embodiments, subscript r is 4 or 6. In these or other such embodiments, subscript n is 1, such as from 5 to 70.

In certain embodiments, subscript q is 1, subscript p is 1, and subscript n is 1, such that $Y^1$ has the formula:

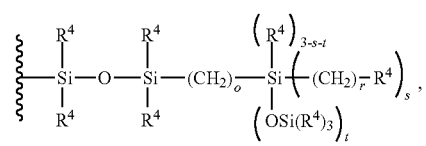

where each $R^4$ and subscripts o, r, s, and t are as defined above. For example, in certain such embodiments, subscript o is 2, subscript s is 0, subscript t is 2, and each $R^4$ is methyl. In other such embodiments, subscript o is 2, subscript s is 1, subscript r is 0, subscript t is 2, and each $R^4$ is methyl. In both of the preceding embodiments, $Y^1$ has the formula:

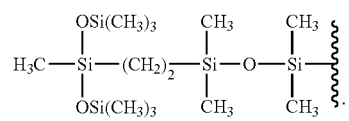

In particular embodiments, the silicone-acrylate polymer (I) comprises at least one siloxane moiety $Y^1$ that is free from a polysiloxane moiety/segment having 10 or more repeating [D] siloxy units.

With further regard to formula (I), as introduced above, each $D^1$ is an independently selected divalent linking group. Divalent linking groups suitable for $D^1$ are not particularly limited. Typically, the divalent linking group $D^1$ is selected from divalent hydrocarbon groups. Examples of such hydrocarbon groups include divalent forms of the hydrocarbyl and hydrocarbon groups described above, such as any of those set forth above with respect to R. As such, it will be appreciated that suitable hydrocarbon groups for the divalent linking group $D^1$ may be substituted or unsubstituted, and linear, branched, and/or cyclic.

In some embodiments, divalent linking group $D^1$ comprises, alternatively is a linear or branched hydrocarbon moiety, such as a substituted or unsubstituted alkyl group, alkylene group, etc. For example, in certain embodiments, divalent linking group $D^1$ comprises, alternatively is, a $C_1$-$C_{18}$ hydrocarbon moiety, such as a linear hydrocarbon moiety having the formula —$(CH_2)_d$—, where subscript d is from 1 to 18. In some such embodiments, subscript d is from 1 to 16, such as from 1 to 12, alternatively from 1 to 10, alternatively from 1 to 8, alternatively from 1 to 6, alternatively from 2 to 6, alternatively from 2 to 4. In particular embodiments, subscript d is 3, such that divalent linking group $D^1$ comprises, alternatively is, a propylene (i.e., a chain of 3 carbon atoms). As will be appreciated by those of skill in the art, each unit represented by subscript d is a methylene unit, such that linear hydrocarbon moiety may be defined or otherwise referred to as an alkylene group. It will also be appreciated that each methylene group may independently be unsubstituted and unbranched, or substituted (e.g. with a hydrogen atom replaced with a non-hydrogen atom or group) and/or branched (e.g. with a hydrogen atom replaced with an alkyl group). In certain embodiments, divalent linking group $D^1$ comprises, alternatively is, an unsubstituted alkylene group.

In some embodiments, divalent linking group $D^1$ comprises, alternatively is, a substituted hydrocarbon moiety, such as a substituted alkylene group. In such embodiments, divalent linking group $D^1$ may comprise a carbon backbone having at least 2 carbon atoms and at least one heteroatom (e.g. O, N, S, etc.), such that the backbone comprises an ether moiety, an amine moiety, etc. For example, in particular embodiments, divalent linking group $D^1$ comprises, alternatively is, an amino substituted hydrocarbon group (i.e., a hydrocarbon comprising a nitrogen-substituted carbon chain/backbone). For example, in some such embodiments, the divalent linking group $D^1$ is an amino substituted hydrocarbon having formula —$D^3$—$N(R^4)$—$D^3$—, where each $D^3$ is an independently selected divalent hydrocarbon group, and $R^4$ is as defined above (i.e., a hydrocarbyl group, such as an alkyl group (e.g. methyl, ethyl, etc.). In certain embodiments, $R^4$ is methyl in the amino substituted hydrocarbon of the preceding formula. Each $D^3$ typically comprises an independently selected alkylene group, such as any of those described above with respect to divalent linking group $D^1$. For example, in some embodiments, each $D^3$ is independently selected from alkylene groups having from 1 to 8 carbon atoms, such as from 2 to 8, alternatively from 2 to 6, alternatively from 2 to 4 carbon atoms. In certain embodiments, each $D^3$ is propylene (i.e., —$(CH_2)_3$—). However, it is to be appreciated that one or both $D^3$ may be, or comprise, another divalent linking group (i.e., aside from the alkylene groups described above). Moreover, each $D^3$ may be substituted or unsubstituted, linear or branched, and various combinations thereof.

With continued regard to formula (I), as introduced above, $X^1$ represents an epoxide-functional moiety, i.e., a moiety comprising an epoxide group. The epoxide group is not particularly limited, and may be any group comprising an epoxide (e.g. a two carbon three-atom cyclic ether). For example, $X^1$ may comprise, or be, a cyclic epoxide or a linear epoxide. As understood by those of skill in the art, epoxides (e.g. epoxide groups) are generally described in terms of the carbon skeleton the two epoxide carbons compose (e.g. the epoxyalkane derived from epoxidation of an alkene). For example, linear epoxides generally comprise a linear hydrocarbon comprising two adjacent carbon atoms bonded to the same oxygen atom. Similarly, cyclic epoxides generally comprise cyclic hydrocarbon comprising two adjacent carbon atoms bonded to the same oxygen atom, where at least one, but typically both, adjacent carbon atom is in the ring of the cyclic structure (i.e., is part of both the epoxide ring and the hydrocarbon ring). The epoxide may be a terminal epoxide or an internal epoxide. Specific examples of suitable epoxides for $X^1$ include epoxyalkyl groups (e.g. epoxyethyl groups, epoxypropyl groups (i.e., oxiranylmethyl groups), oxiranylbutyl groups, epoxyhexyl groups, oxiranyloctyl groups, etc.), epoxycycloalkyl groups (e.g. epoxycyclopentyl groups, epoxycyclohexyl groups, etc.), glycidyloxyalkyl groups (e.g. a 3-glycidyloxypropyl group, a 4-glycidyloxybutyl group, etc.), and the like. One of skill in the art will appreciate that such epoxide groups may be substituted or unsubstituted.

In certain embodiments, $X^1$ comprises, alternatively is, a hydrocarbyl group substituted with an epoxyethyl group of the formula

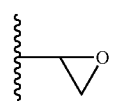

or an epoxycyclohexyl group of the formula

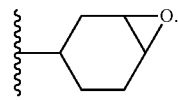

In particular embodiments, $X^1$ is an epoxypropyl group of formula

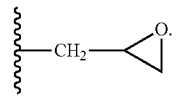

With further regard to formula (I), as introduced above, each $R^1$ is independently selected from H and $CH_3$. Said differently, $R^1$ is independently H or $CH_3$ in each moiety indicated by subscript a, independently H or $CH_3$ in each moiety indicated by subscript b, and independently H or $CH_3$ in each moiety indicated by subscript c. In certain embodiments, $R^1$ is $CH_3$ in each moiety indicated by subscript a. In these or other embodiments, $R^1$ is $CH_3$ in each moiety indicated by subscript b. In these or other embodiments, $R^1$ is $CH_3$ in each moiety indicated by subscript c. In certain embodiments, $R^1$ is $CH_3$ in each moiety indicated by subscripts a and b, and $R^1$ is H in each moiety indicated by subscript c. It will be appreciated, however, that moieties indicated by subscripts a, b, and/or c may comprise a mixture of different $R^1$ groups. For example, in certain embodiments, $R^1$ is H in a predominant amount of moieties indicated by subscripts c, $R^1$ is $CH_3$ in the remaining moieties indicated by subscripts c.

With further regard to formula (I), as introduced above, $R^2$ represents a substituted or unsubstituted hydrocarbyl group. Examples of such hydrocarbyl groups include those described above with respect to R.

In some embodiments, $R^2$ is a hydrocarbyl group having from 1 to 20 carbon atoms. In certain such embodiments, $R^2$ comprises, alternatively is, an alkyl group. Suitable alkyl groups include saturated alkyl groups, which may be linear, branched, cyclic (e.g. monocyclic or polycyclic), or combinations thereof. Examples of such alkyl groups include those having the general formula $C_jH_{2j-2k+1}$, where subscript j is from 1 to 20 (i.e., the number of carbon atoms present in the alkyl group), subscript k is the number of independent rings/cyclic loops, and at least one carbon atom designated by subscript j is bonded to the carboxylic oxygen shown bonded to $R^2$ in formula (I) above. Examples of linear and branched isomers of such alkyl groups (i.e., where the alkyl group is free from cyclic groups such that subscript k=0), include those having the general formula $C_jH_{2j+1}$, where subscript j is as defined above and at least one carbon atom designated by subscript j is bonded to the carboxylic oxygen shown bonded to $R^2$ in formula (I) above. Examples of monocyclic alkyl groups include those having the general formula $C_jH_{2j-1}$, where subscript j is as defined above and at least one carbon atom designated by subscript j is bonded to the carboxylic oxygen shown bonded to $R^2$ in formula (I) above. Specific examples of such alkyl groups include methyl groups, ethyl groups, propyl groups, butyl groups, pentyl groups, hexyl groups, heptyl groups, octyl groups, nonyl groups, decyl groups, undecyl groups, dodecyl groups, tridecyl groups, tetradecyl groups, pentadecyl groups, hexadecyl groups, heptadecyl groups, octadecyl groups, nonadecyl groups, and eicosyl groups, including linear, branched, and/or cyclic isomers thereof. For example, pentyl groups encompass n-pentyl (i.e., a linear isomer) and cyclopentyl (i.e., a cyclic isomer), as well as branched isomers such as isopentyl (i.e., 3-methylbutyl), neopentyl (i.e., 2,2-dimethylpropy), tert-pentyl (i.e., 2-methylbutan-2-yl), sec-pentyl (i.e., pentan-2-yl), sec-isopentyl (i.e., 3-methylbutan-2-yl) etc.), 3-pentyl (i.e., pentan-3-yl), and active pentyl (i.e., 2-methylbutyl).

In certain embodiments, each $R^2$ is independently selected from alkyl groups having from 1 to 12 carbon atoms, such as from 1 to 8, alternatively from 2 to 8, alternatively from 2 to 6 carbon atom(s). In such embodiments, each $R^2$ is typically selected from methyl groups, ethyl groups, propyl groups (e.g. n-propyl and iso-propyl groups), butyl groups (e.g. n-butyl, sec-butyl, iso-butyl, and tert-butyl groups), pentyl groups (e.g. those described above), hexyl groups, heptyl groups, etc., and the like, as well as derivatives and/or modifications thereof. Examples of derivatives and/or modifications of such alkyl groups include substituted versions thereof. For example, $R^2$ may comprise, alternatively may be, a hydroxyl ethyl group, which will be understood to be a derivative and/or a modification of the ethyl groups described above. Likewise, $R^2$ may comprise, alternatively may be, an acetoacetoxyethyl group, which will also be understood to be a derivative and/or a modification of the ethyl groups described above (e.g. as an acetoacetoxy-substituted ethyl group), as well as a derivative and/or a modification of other hydrocarbyl groups described above (e.g. a hexyl group substituted with an ester and a ketone, etc.).

In certain embodiments, each $R^2$ is independently selected from ethyl, n-butyl, isobutyl, isobornyl, cyclohexyl, neopentyl, 2-ethylhexyl, hydroxyethyl, and acetoacetoxyethyl groups. In particular embodiments, at least one $R^2$ is a butyl group (e.g. n-butyl).

Subscripts a, b, and c represent the number of monomeric units shown in formula (I) above, where the silicone-acrylate polymer (I) comprises at least 1 of the moieties indicated by subscript a (i.e., subscript a≥1), at least 1 of the moieties indicated by subscript b (i.e., subscript b 1), and, optionally, one or more of the moieties indicated by subscript c (i.e., subscript c≥0). Said differently, in general, subscript a is at least 1, alternatively is greater than 1, subscript b is at least 1, alternatively is greater than 1, and subscript c is 0, 1, or greater than 1. In certain embodiments, subscript a is a value of from 1 to 100, such as from 1 to 80, alternatively from 1 to 70, alternatively from 1 to 60, alternatively from 1 to 50, alternatively from 1 to 40, alternatively from 1 to 30, alternatively from 1 to 25, alternatively from 5 to 25. In these or other embodiments, subscript b is a value of from 1 to 100, such as from 1 to 80, alternatively from 1 to 70, alternatively from 1 to 60, alternatively from 1 to 50, alternatively from 1 to 40, alternatively from 1 to 30, alternatively from 1 to 20, alternatively from 1 to 10. In particular embodiments, subscript c is 0. In other embodiments, subscript c≥1. For example, in some such embodiments, subscript c is a value of from 1 to 100, such as from 1 to 80, alternatively from 1 to 70, alternatively from 1 to 60, alternatively from 1 to 50, alternatively from 1 to 40, alternatively from 1 to 30, alternatively from 1 to 20, alternatively from 1 to 15. In some embodiments, the silicone-acrylate polymer (I) has a degree of polymerization (DP) of from 2 to 100, such as from 2 to 50, alternatively from 5 to 50, alternatively from 10 to 50.

It will be appreciated that the moieties indicated by subscripts a, b, and c are independently selected. As such, for example, when subscript a is at least 2, the silicone-acrylate polymer (I) may comprise more than one moiety indicated by subscript a (i.e., different from one another by different selections of $R^1$, $D^1$, and/or $Y^1$). Likewise, when subscript b is at least 2, the silicone-acrylate polymer (I) may comprise more than one moiety indicated by subscript b (i.e., different from one another by different selections of $R^1$ and/or $X^1$). Similarly, when subscript c is at least 2, the silicone-acrylate polymer (I) may comprise more than one moiety indicated by subscript c (i.e., different from one another by different selections of $R^1$ and/or $R^2$). For example, in certain embodiments, subscript c is 0 and the silicone-acrylate polymer (I) comprises more than one moiety indicated subscript a different from one another by different selections of $Y^1$, such that formula (I) above can be rewritten into the following general unit formula:

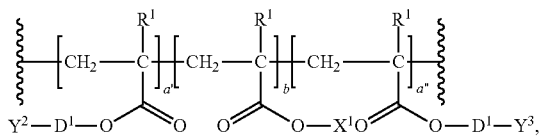

where $Y^2$ and $Y^3$ are different selections of the siloxane moiety $Y^1$ described above, subscript a' is ≥1, subscript a" is ≥1, a'+a"=a (i.e., the sum of subscripts a' and a" equal subscript a of formula (I) described above), and each $R^1$, $D^1$, $X^1$, and subscript b is as defined and described above. In some such embodiments, for example, each $Y^2$ is independently a branched siloxane moiety having the general formula $—Si(R^3)_3$ and each $Y^3$ is independently a linear siloxane moiety having the following general formula:

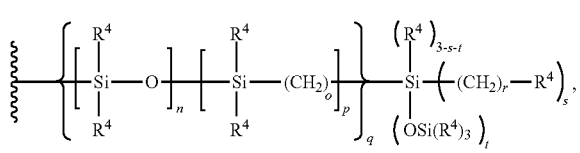

where each variable is as described above with respect to the same particular moieties of the siloxane moiety $Y^1$. One of skill in the art will appreciate that other combinations and variations within the silicone-acrylate polymer (I), i.e., with respect to the moieties indicated by subscripts a, b, and c, are equally possible within the bounds of the description and examples herein.

In particular embodiments, subscript c is >0 (i.e., c≥1), and the silicone-acrylate polymer (I) comprises at least one siloxane moiety $Y^1$ that is free from a polysiloxane moiety/segment having 10 or more repeating [D] siloxy units. In such embodiments, the silicone-acrylate polymer (I) may comprise more than one moiety indicated subscript a different from one another by different selections of $Y^1$, or may comprise but one type/kind of moiety indicated subscript a, so long as at least one $Y^1$ is free from a polysiloxane moiety (e.g. a polydiorganosiloxane moiety, such as a polydimethylsiloxane segment) having 10 or more repeating [D] siloxy units.

In certain embodiments, the silicone-acrylate polymer (I) comprises a weight-average molecular weight (Mw) of at least 500 Da and less than 75000 Da. For example, the silicone-acrylate polymer (I) may comprise a Mw of from 500 to 70000, alternatively from 1000 to 70000, alternatively from 1000 to 60000, alternatively from 1000 to 50000, alternatively from 2000 to 50000, alternatively from 2500 to 50000 Da. In certain embodiments, the silicone-acrylate polymer (I) comprises a number-average molecular weight (Mn) of at least 500 Da and less than 7500 Da. For example, the silicone-acrylate polymer (I) may comprise a Mn of from 500 to 70000, alternatively from 1000 to 70000, alternatively from 1000 to 60000, alternatively from 1000 to 50000, alternatively from 1000 to 40000, alternatively from 1000 to 35000, alternatively from 2000 to 35000, alternatively from 2500 to 35000 Da. In certain embodiments, the silicone-acrylate polymer (I) comprises a peak molecular weight (Mp) (i.e., an average molecular weight representing the mode of molecular weight distributions) of from 1000 to 50,000, alternatively from 2000 to 45000, alternatively from 3000 to 45000 Da. The molecular weight(s) of the silicone-acrylate polymer (I) may be readily determined by techniques known in the art, such as via gel permeation chromatography (GPC) against polystyrene standards (e.g. using size exclusion chromatography (GPC/SEC)).

A method of preparing the silicone-acrylate polymer (I) (the "polymerization method") is also provided, and includes reacting (A) an acryloxy-functional organosilicon component, (B) an epoxy-functional acrylate component, and optionally (C) an acrylate component, to give the silicone-acrylate polymer (I).

As will be appreciated by those of skill in the art in view of the description herein, each of components (A), (B), and (C) comprises a monomer that forms a unit represented in formula (I) of the silicone-acrylate polymer (I) described above (e.g. via polymerization/reaction). Accordingly, the description above with regard to particular functional groups and variables of the silicone-acrylate polymer (I) (e.g. $R^1$, $D^1$, and $Y^1$, $X^1$, $R^2$.) applies equally to the particular monomers utilized in the polymerization method, which are described in turn below.

The acryloxy-functional organosilicon component (A) comprises an acryloxy-functional organosilicon monomer having the general formula:

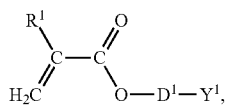

where $R^1$, $D^1$, and $Y^1$ are as defined and described above. More specifically, as will be appreciated by those of skill in the art in view of the description herein, the acryloxy-functional organosilicon monomer of component (A) forms moieties indicated by subscript a in formula (I) of the silicone-acrylate polymer (I) described above. As such, the description above with regard to $R^1$, $D^1$, and $Y^1$ of the silicone-acrylate polymer (I) applies equally to the acryloxy-functional organosilicon monomer.

For example, in certain embodiments, $D^1$ comprises a linear alkylene group, optionally substituted with an alkyl amino group, and $Y^1$ comprises a branched siloxane moiety. In such embodiments, the acryloxy-functional organosilicon monomer may have the following general formula:

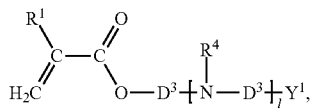

where each $D^3$ is an independently selected linear alkylene group having from 2 to 6 carbon atoms, $R^4$ is an alkyl group (e.g. methyl, ethyl, etc.), subscript l is 0 or 1, and $R^1$ and $Y^1$ are as defined and described above. In some such embodiments, subscript l is 1, each $D^3$ is a propylene group, and $R^4$ is methyl, such that the acryloxy-functional organosilicon monomer has the following general formula:

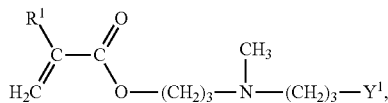

where $R^1$ and $Y^1$ are as defined and described above. In other such embodiments, subscript l is 0 and $D^3$ is a propylene group, such that the acryloxy-functional organosilicon monomer has the following general formula:

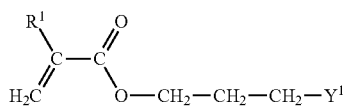

where $R^1$ and $Y^1$ are as defined and described above.

With regard to the preceding formulae of the acryloxy-functional organosilicon monomer, the siloxane monomer may be linear or branched. For example, in some embodiments, $Y^1$ is a branched siloxane of formula $-Si(R^3)_3$ as defined and described above. In some such embodiments, $Y^1$ is selected from the following branched siloxane moieties (i)-(iv):

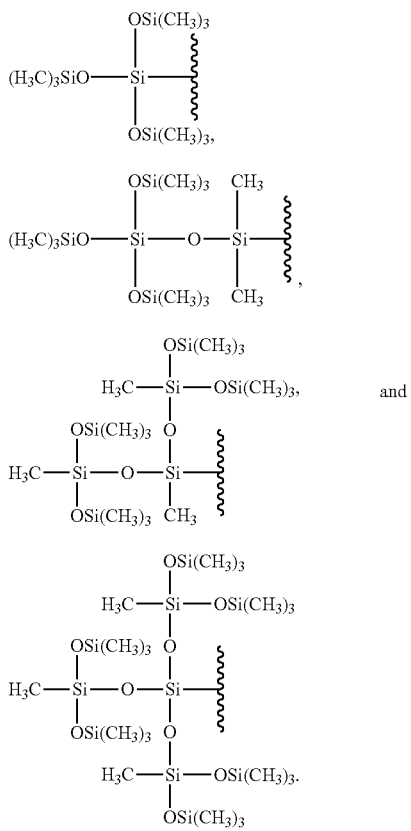

In some embodiments, $Y^1$ is a linear siloxane moiety having the following general formula:

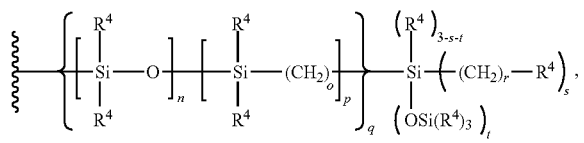

where each of subscripts n, o, p, q, r, s, and t and each $R^4$ is as defined and described above. For example, in some such embodiments, each $R^4$ is methyl, such that $Y^1$ is a linear siloxane moiety having the following general formula:

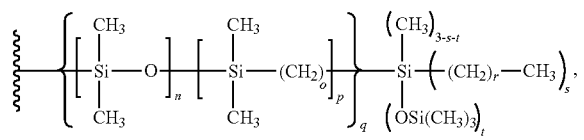

where subscripts n, o, p, q, r, s, and t are as defined and described above. However, it is to be appreciated that any $R^4$ may be selected from other hydrocarbyl groups, such as those described above. In some such embodiments, $Y^1$ is selected from the following siloxane moieties (i)-(iii):

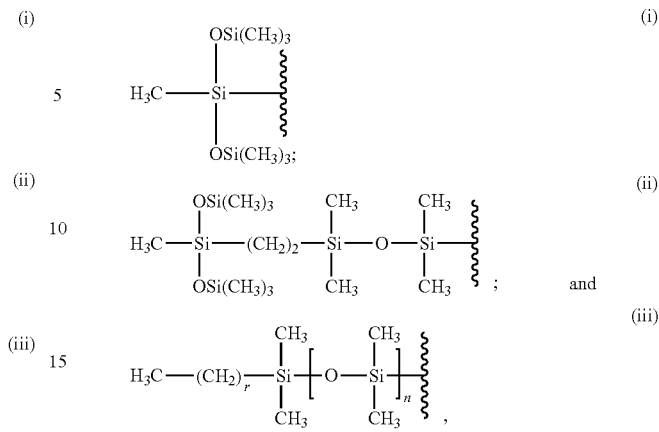

where $1 \leq n \leq 100$ and subscript r is from 3 to 9. In particular embodiments, subscript n is from 0 to 9, such that the siloxane moiety $Y^1$ is free from polysiloxane moieties (i.e., the segment indicated by subscript q) having 10 or more repeating [D] siloxy units.

With regard to the preceding formulae of the acryloxy-functional organosilicon monomer, $R^1$ is H or $CH_3$. In certain embodiments, $R^1$ is H (i.e., the acryloxy-functional organosilicon monomer comprises an acryloxy group). In other embodiments, $R^1$ is $CH_3$ such that the acryloxy-functional organosilicon component (A) comprises a (meth)acryloxy-functional organosilicon monomer (i.e., the acryloxy-functional organosilicon monomer is further defined as (meth)acryloxy-functional). In both instances, as will be understood by those of skill in the art, the term acryloxy-functional may be used to denote a genus encompassing both unsubstituted acryloxy functionality (e.g. where $R^1$ is H) as well as methyl-substituted acryloxy functionality (e.g. where $R^1$ is $CH_3$), just as the term "acrylate" is conventionally understood to encompass acrylic esters, (meth)acrylic esters, etc.

The acryloxy-functional organosilicon monomer may be utilized in any amount in component (A), which will be selected by one of skill in the art, e.g. dependent upon the particular components selected for reacting, the reaction parameters employed, the scale of the reaction (e.g. total amounts of the acryloxy-functional organosilicon monomer to be reacted and/or silicone-acrylate polymer (I) to be prepared), etc.

The acryloxy-functional organosilicon monomer may be prepared or otherwise obtained, i.e., as a prepared compound. Methods of preparing the acryloxy-functional organosilicon monomer are known in the art, with such compounds and suitable starting materials commercially available from various suppliers. Preparing the acryloxy-functional organosilicon monomer, when part of the method, may be performed prior to combining the same with, or in the presence of, any other component of the acryloxy-functional organosilicon component (A).

Likewise, the acryloxy-functional organosilicon monomer may be utilized in any form in component (A), such as neat (i.e., absent solvents, carrier vehicles, diluents, etc.), or disposed in a carrier vehicle, such as a solvent or dispersant. For example, the acryloxy-functional organosilicon component (A) may comprise a carrier vehicle, such as one of those described herein. It will be appreciated that the acryloxy-functional organosilicon monomer may be combined with the carrier vehicle, if utilized, prior to, during, or after being combined with any one or more other components of the acryloxy-functional organosilicon component (A). In some embodiments, the acryloxy-functional organosilicon component (A) is free from, alternatively substantially free from carrier vehicles. For example, in certain embodiments, the method may comprise stripping the acryloxy-functional organosilicon monomer of volatiles and/or solvents, or distilling the acryloxy-functional organosilicon monomer from solvents, volatiles, etc., to prepare the acryloxy-functional organosilicon component (A).

The acryloxy-functional organosilicon component (A) may comprise but one type of acryloxy-functional organosilicon monomer or, alternatively, may comprise more than one type of acryloxy-functional organosilicon monomer, such as two, three, or more acryloxy-functional organosilicon monomers that differ from one another with regard to at least one of variables $R^1$, $D^1$, and $Y^1$ as defined and described above.

The epoxy-functional acrylate component (B) comprises an oxiranyl-functional acryloxy monomer (i.e., an oxiranyl acrylate ester monomer) having the general formula:

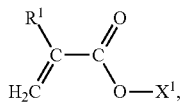

where $R^1$ and $X^1$ are as defined and described above. More specifically, as will be appreciated by those of skill in the art in view of the description herein, the oxiranyl-functional acryloxy monomer of component (B) forms moieties indicated by subscript b in formula (I) of the silicone-acrylate polymer (I) described above. As such, the description above with regard to $R^1$ and $X^1$ of the silicone-acrylate polymer (I) applies equally to the oxiranyl-functional acryloxy monomer of component (B).

For example, in certain embodiments, $X^1$ comprises an epoxyalkyl group (e.g. an epoxyethyl group, epoxypropyl group (i.e., oxiranylmethyl group), oxiranylbutyl group, epoxyhexyl group, oxiranyloctyl group, etc.) or an epoxycycloalkyl group (e.g. an epoxycyclopentyl group, epoxycyclohexyl groups, etc.). For example, in some embodiments, $X^1$ comprises, alternatively is, a hydrocarbyl group substituted with an epoxyethyl group of the formula

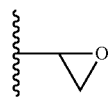

or an epoxycyclohexyl group of the formula

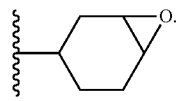

In particular embodiments, $X^1$ is an epoxypropyl group of formula

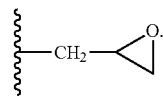

With regard to the preceding formulae of the oxiranyl-functional acryloxy monomer, $R^1$ is H or $CH_3$. In certain embodiments, $R^1$ is H (i.e., the oxiranyl-functional acryloxy monomer comprises an acryloxy group). In other embodiments, $R^1$ is $CH_3$ such that the epoxy-functional acrylate component (B) comprises an oxiranyl-functional (meth) acryloxy monomer.

In view of the description herein, one of skill in the art will appreciate that examples of suitable oxiranyl-functional acryloxy monomers for use in or as component (B) include glycidyl acrylates, epoxycyclohexyl acrylates, and the like. For example, in certain embodiments, epoxy-functional acrylate component (B) comprises glycidyl acrylate, glycidyl (meth)acrylate, glycidyloxybutyl acrylate, (3,4-epoxycyclohexyl)methyl acrylate, (3,4-epoxycyclohexyl)methyl (meth)acrylate, (3,4-epoxycyclohexyl)ethyl acrylate, (3,4-epoxycyclohexyl)ethyl (meth)acrylate, or a combination thereof.

The oxiranyl-functional acryloxy monomer may be utilized in any amount in component (B), which will be selected by one of skill in the art, e.g. dependent upon the particular components selected for reacting, the reaction parameters employed, the scale of the reaction (e.g. total amounts of the oxiranyl-functional acryloxy monomer to be reacted and/or silicone-acrylate polymer (I) to be prepared), etc.

The oxiranyl-functional acryloxy monomer may be prepared or otherwise obtained, i.e., as a prepared compound. Methods of preparing the oxiranyl-functional acryloxy monomer are known in the art, with such compounds and suitable starting materials commercially available from various suppliers. Preparing the oxiranyl-functional acryloxy monomer, when part of the method, may be performed prior to combining the same with, or in the presence of, any other component of the epoxy-functional acrylate component (B).

Likewise, the oxiranyl-functional acryloxy monomer may be utilized in any form in component (B), such as neat (i.e., absent solvents, carrier vehicles, diluents, etc.), or disposed in a carrier vehicle, such as a solvent or dispersant. For example, the epoxy-functional acrylate component (B) may comprise a carrier vehicle, such as one of those described herein. It will be appreciated that the oxiranyl-functional acryloxy monomer may be combined with the carrier vehicle, if utilized, prior to, during, or after being combined with any one or more other components of the epoxy-functional acrylate component (B). In some embodiments, the epoxy-functional acrylate component (B) is free from, alternatively substantially free from carrier vehicles. For example, in certain embodiments, the method may comprise stripping the oxiranyl-functional acryloxy monomer of volatiles and/or solvents, or distilling the oxiranyl-functional acryloxy monomer from solvents, volatiles, etc., to prepare the epoxy-functional acrylate component (B) (e.g. when the method includes preparing the oxiranyl-functional acryloxy monomer).

The epoxy-functional acrylate component (B) may comprise but one type of oxiranyl-functional acryloxy monomer or, alternatively, may comprise more than one type of oxiranyl-functional acryloxy monomer, such as two, three, or more oxiranyl-functional acryloxy monomers that differ from one another with regard to at least one of variables $R^1$ and $X^1$ as defined and described above.

The acrylate component (C) comprises an acrylate monomer having the general formula:

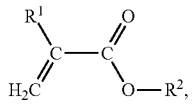

where $R^1$ and $R^2$ are as defined and described above. More specifically, as will be appreciated by those of skill in the art in view of the description herein, the acrylate monomer of component (C) forms moieties indicated by subscript c in formula (I) of the silicone-acrylate polymer (I) described above. As such, the description above with regard to $R^1$ and $R^2$ of the silicone-acrylate polymer (I) applies equally to the acrylate monomer of component (C).

As introduced above, $R^1$ is H or $CH_3$ and $R^2$ is a hydrocarbyl group. Accordingly, the acrylate monomer is generally selected from substituted and unsubstituted acrylic esters, such as acrylate esters (i.e., "acrylates") and (meth) acrylate esters (i.e., "(meth)acrylates," or "methacrylates") acrylic esters, which may also be referred to as acryloxy or (meth)acryloxy-functional hydrocarbon compounds, respectively, and may be monofunctional or polyfunctional (e.g. with respect to the number of acryloxy groups thereon).

Examples of specific monofunctional acrylic esters suitable for use as the acrylate monomer of component (C) include (alkyl)acrylic compounds, such as methyl acrylate, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxy-ethyl (meth)acrylate, 4-phenylphenoxyethyl (meth)acrylate, 3-(2-phenylphenyl)-2-hydroxypropyl (meth)acrylate, polyoxyethylene-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, polyoxyethylene-modified phenoxy (meth) acrylate, polyoxypropylene-modified phenoxy (meth)acrylate, polyoxyethylene nonylphenyl ether (meth)acrylate, isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth) acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, benzyl (meth)acrylate, 1-naphthylmethyl (meth)acrylate, 2-naphthylmethyl (meth)acrylate, tetrahydrofurfuryl (meth) acrylate, butoxyethyl (meth)acrylate, ethoxydiethylene glycol (meth)acrylate, poly(ethylene glycol) mono(meth)acrylate, poly(propylene glycol) mono(meth)acrylate, methoxyethylene glycol (meth)acrylate, ethoxyethyl (meth) acrylate, methoxypoly(ethylene glycol) (meth)acrylate, methoxypoly(propylene glycol) (meth)acrylate, and the like, as well as derivatives thereof.

Examples of specific polyfunctional acrylic monomers include (alkyl)acrylic compounds having two or more acryloyl or methacryloyl groups, such as trimethylolpropane di(meth)acrylate, trimethylolpropane tri(meth)acrylate, polyoxyethylene-modified trimethylolpropane tri(meth) acrylate, polyoxypropylene-modified trimethylolpropane tri (meth)acrylate, polyoxyethylene/polyoxypropylene-modified trimethylolpropane tri(meth)acrylate, dimethyloltricyclodecane di(meth)acrylate, pentaerythritol tri(meth)acrylate, pentaerythritol tetra(meth)acrylate, ethylene glycol di(meth)acrylate, tetraethylene glycol di(meth) acrylate, phenylethylene glycol di(meth)acrylate, poly(ethylene glycol) di(meth)acrylate, poly(propylene glycol) di(meth)acrylate, 1,4-butanediol di(meth)acrylate, 1,6-hexanediol di(meth)acrylate, neopentyl glycol di(meth)acrylate, 1,9-nonanediol di(meth)acrylate, 1,10-decanediol di(meth)acrylate, 1,3-adamantanedimethanol di(meth)acrylate, o-xylylene di(meth)acrylate, m-xylylene di(meth)acrylate, p-xylylene di(meth)acrylate, tris(2-hydroxyethyl)isocyanurate tri(meth)acrylate, tris(acryloyloxy) isocyanurate, bis(hydroxymethyl)tricyclodecane di(meth)acrylate, dipentaerythritol penta(meth)acrylate, dipentaerythritol hexa(meth)acrylate, polyoxyethylene-modified 2,2-bis(4-((meth) acryloxy)phenyl)propane, polyoxypropylene-modified 2,2-bis(4-((meth)acryloxy)phenyl)propane, polyoxyethylene/polyoxypropylene-modified 2,2-bis(4-((meth)acryloxy) phenyl)propane, and the like, as well as derivatives thereof.

It is to be appreciated that the exemplary acrylic monomers above are described in terms of (meth)acrylate species only for brevity, and that one of skill in the art will readily understand that other alkyl and/or hydrido versions of such compounds may equally be utilized. For example, one of skill in the art will understand that the monomer "2-ethylhexyl (meth)acrylate" listed above exemplifies both 2-ethylhexyl (meth)acrylate as well as 2-ethylhexyl acrylate. Likewise, while the acrylic monomers are described generally as propenoates (i.e., α,β-unsaturated esters) in the examples above, it is to be appreciated that the term "acrylate" used in these descriptions may equally refer to an acid, salt, and/or conjugate base of the esters exemplified. For example, one of skill in the art will understand that the monomer "methyl acrylate" listed above exemplifies the methyl ester of acrylic acid, as well as acrylic acid, acrylate salts (e.g. sodium acrylate), etc. Furthermore, multifunctional derivatives/variations of the acrylic monomers described above may also be utilized. For example, the monomers "ethyl (meth)acrylate" listed above exemplifies functionalized-derivatives, such as substituted ethyl (meth) acrylates and ethyl acrylates (e.g. hydroxyethyl (meth) acrylate and hydroxyethyl acrylate, respectively).

In certain embodiments, the acrylic ester monomer of component (C) is selected from methyl acrylate (MA), ethyl acrylate (EA), n-butyl acrylate (BA), isobutyl acrylate, isobornyl acrylate, cyclohexyl acrylate, neopentyl acrylate, 2-ethylhexyl acrylate (2-EHA), hydroxyethyl acrylate (HEA), methyl (meth)acrylate (MMA), ethyl (meth)acrylate (EMA), n-butyl (meth)acrylate (BMA), isobutyl (meth)acrylate, isobornyl (meth)acrylate, cyclohexyl (meth)acrylate, neopentyl (meth)acrylate, 2-ethylhexyl (meth)acrylate (2-EHMA), hydroxyethyl (meth)acrylate (HEMA), and acetoacetoxyethyl (meth)acrylate (AAEM).

The acrylic ester monomer may be utilized in any amount in component (C), which will be selected by one of skill in the art, e.g. dependent upon the particular components selected for reacting, the reaction parameters employed, the scale of the reaction (e.g. total amounts of the acrylic ester monomer to be reacted and/or silicone-acrylate polymer (I) to be prepared), etc.

The acrylic ester monomer may be prepared or otherwise obtained, i.e., as a prepared compound. Methods of preparing the acrylic ester monomer are known in the art, with such compounds and suitable starting materials commercially available from various suppliers. Preparing the acrylic ester monomer, when part of the method, may be performed prior to combining the same with, or in the presence of, any other component of the acrylate component (C). In general, methods of preparing acrylate-functional compounds utilize at least one acrylic monomer having an acryloyloxy or alkylacryloyloxy group (i.e., acrylates, alkylacrylates, acrylic acids, alkylacrylic acids, and the like, as well as derivatives and/or combinations thereof). Such acrylic monomers may be monofunctional or polyfunctional acrylic monomers.

Likewise, the acrylic ester monomer may be utilized in any form in component (C), such as neat (i.e., absent solvents, carrier vehicles, diluents, etc.), or disposed in a carrier vehicle, such as a solvent or dispersant. For example, the acrylate component (C) may comprise a carrier vehicle, such as one of those described herein. It will be appreciated that the acrylic ester monomer may be combined with the carrier vehicle, if utilized, prior to, during, or after being combined with any one or more other components of the acrylate component (C). In some embodiments, the acrylate component (C) is free from, alternatively substantially free from carrier vehicles. For example, in certain embodiments, the method may comprise stripping the acrylic ester monomer of volatiles and/or solvents, or distilling the acrylic ester monomer from solvents, volatiles, etc., to prepare the acrylate component (C) (e.g. when the method includes preparing the acrylic ester monomer).

The acrylate component (C) may comprise but one type of acrylic ester monomer or, alternatively, may comprise more than one type of acrylic ester monomer, such as two, three, or more acryloxy-functional organosilicon monomers that differ from one another with regard to at least one of variables $R^1$ and $R^2$ as defined and described above.

Moreover, the acrylate component (C) may comprise additional monomers or coreactants, i.e., other than the acrylic ester monomer(s) described above, The additional monomer(s)/coreactants are not particularly limited, and may be selected from carboxylic acid monomers, such as acrylic acid (AA), (meth)acrylic acid (MAA), and derivatives thereof (e.g. acids of any of the acrylate esters described above), itaconic acid, and salts thereof; acrylamide monomers, such as amide derivatives/forms of any of the acrylate esters described above (e.g. isodecylacrylamide, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, etc.); sulfonic acid monomers, such as sodium styrene sulfonate, acrylamidomethyl-propane sulfonate, and salts thereof; phosphoric acid monomers, such as phosphoethylmethacrylate and salts thereof; other monomers such as styrene, acrylonitrile, and copolymerized multi-ethylenically unsaturated monomer groups (e.g. allyl (meth)acrylate, diallyl phthalate, 1,4-butylene glycol di(meth)acrylate, 1,2-ethylene glycol di(meth)acrylate, 1,6-hexanediol di(meth)acrylate, divinyl benzene, etc.); and the like, as well as derivatives, modifications, and combinations thereof. It may also be advantageous to incorporate such monomer groups non-uniformly into the silicone-acrylate polymer (I) to form multiphase particles, e.g. having a core-shell, hemispherical, or occluded morphology.

In certain embodiments, the acryloxy-functional organosilicon component (A) and the epoxy-functional acrylate component (B), and optionally the acrylate component (C), are reacted in the presence of (D) a free radical initiator (i.e., the "initiator (D)") to prepare the silicone-acrylate polymer (I).

The particular type or specific compound(s) selected for use in or as the initiator (D) will be readily selected by those of skill in the art based on the particular components (A) and (B), and optionally (C) selected, any carrier vehicle present in the reaction, if any, etc. In general, the initiator (D) is not particularly limited, and may comprise or be any compound suitable for facilitating the polymerization of the alkenyl functionality of the various monomer(s) of components (A), (B), and (C) (e.g. via radical polymerization, radical coupling, etc.), as will be understood by one of skill in the art in view of the description herein. As such, the initiator (D) is typically a radical polymerization initiator, such as any of those conventionally used in polymerization of vinyl-functional compounds.

Examples of initiators include various peroxides, such as inorganic peroxides (e.g. hydrogen peroxide derivatives of potassium persulfate, sodium persulfate, ammonium persulfate, etc.) and various organic peroxides including benzoyl peroxide, t-butylperoxy maleic acid, succinic acid peroxides, t-butyl hydroperoxide, tert-butyl peroxypivalate, etc. Additional examples of initiators include compounds that generates a free radical upon exposure to a reaction condition, e.g. when exited by a certain type of energy source (e.g. heat, UV light, etc.) etc. Examples of such compounds include (2,2,6,6-Tetramethylpiperidin-1-yl)oxyl (TEMPO), triazines, thiazines such as 10-phenylphenothiazine, 9,9'-bixanthene-9,9'-diol, 2,2-dimethoxy-2-phenylacetophenone, peroxides such as 2,5-dimethyl-2,5-di-(tert-butylperoxy) hexane (DBPH), and the like, as well as derivatives, modifications, and combinations thereof. In some embodiments, the initiator (D) may comprise or be a photoactivatable catalyst, which may initiate polymerization via irradiation and/or heat (e.g. upon exposure to radiation having a wavelength of from 150 to 800 nanometers (nm), etc.). For example, in certain embodiments, the initiator (D) may comprise a fac-tris(2-phenylpyridine)-based catalyst, which may be utilized to polymerize the monomers of components (A), (B), and (C) via a reaction comprising light-mediated radical generation. Other examples of suitable initiators aside from those above (e.g. various peroxy and azo compounds), are known in the art.

The initiator (D) may be utilized in any amount, which will be selected by one of skill in the art, e.g. dependent upon the particular initiator (D) selected (e.g. the concentration/amount of active components thereof, the type of catalyst being utilized, etc.), the reaction parameters employed, the scale of the reaction (e.g. total amounts of components (A), (B), (C), etc. The molar ratio of the initiator (D) to components (A), (B), and (C) (i.e., the monomers thereof) utilized in the reaction may influence the rate and/or amount of polymerization to prepare the silicone-acrylate polymer (I). Thus, the amount of the initiator (D) as compared to the monomers of components (A), (B), and (C), as well as the molar ratios therebetween, may vary. Typically, these relative amounts and the molar ratio are selected to maximize the reaction of components (A), (B), and (C), while minimizing the loading of the initiator (D) (e.g. for increased economic efficiency of the reaction, increased ease of purification of the reaction product formed, etc.).

In certain embodiments, the initiator (D) is utilized in a range of from 0.01 to 20 parts by weight, alternatively from 0.1 to 10 parts by weight, based on 100 parts by weight total of component (A).

In certain embodiments, the initiator (D) is utilized in the reaction in an amount of from 0.01 to 20 wt. %, based on the total amount of component (A) utilized (i.e., wt./wt.). For example, the initiator (D) may be used in an amount of from 0.01 to 15 wt. %, such as from 0.1 to 15, alternatively of from 0.1 to 10 wt. %, based on the total amount of component (A) utilized. In other embodiments, the initiator (D) is utilized in the reaction in an amount of from 0.01 to 20 wt. %, based on the total amount of components (A), (B), and (C) utilized, such as in an amount of from 0.01 to 15 wt. %, alternatively of from 0.1 to 15, alternatively of from 1 to 10 wt. %, based on the total amount of components (A), (B), and (C). It will be appreciated that ratios outside of these ranges may be utilized as well, and the initiator (D) may be utilized in one or more portions, each within one of the ranges above (e.g. such as when additional initiator (D) may be utilized during the reaction of components (A), (B), and (C) to reach or otherwise move toward completion. It is also to be appreciated that the initiator (D) may itself comprise more than one type of initiator compound, such as two, three, or more different initiator compounds, which may be individually or collectively utilized in an amount within one of the ranges above.

In certain embodiments, the acryloxy-functional organosilicon component (A) and the epoxy-functional acrylate component (B), and optionally the acrylate component (C), are reacted in the presence of (E) a solvent to prepare the silicone-acrylate polymer (I). Solvents used herein are those that help fluidize the starting materials (i.e., components (A), (B), and (C)) but essentially do not react with any of these starting materials, and are otherwise not particularly limited. As such, the solvent will be selected based on solubility of the starting materials, the volatility (i.e., vapor pressure) of the solvent, the parameters of the polymerization method employed, etc. The solubility refers to the solvent being sufficient to dissolve and/or disperse components (A), (B), and (C). Examples of particular solvents include any of the carrier vehicles, fluids, etc. suitable to sufficiently carry, dissolve, and/or disperse any component(s) of the reaction mixture during the preparation of the silicone-acrylate polymer.

In some embodiments, the solvent (E) comprises, alternatively is, an organic solvent. Examples of organic solvents include: aromatic hydrocarbons, such as benzene, toluene, xylene, mesitylene, etc.; aliphatic hydrocarbons, such as heptane, hexane, octane, etc.; glycol ethers, such as propylene glycol methyl ether, dipropylene glycol methyl ether, propylene glycol n-butyl ether, propylene glycol n-propyl ether, ethylene glycol n-butyl ether, etc.; halogenated hydrocarbons, such as dichloromethane, 1,1,1-trichloroethane, and chloroform; ketones, such as acetone, methylethyl ketone, or methyl isobutyl ketone; acetates, such as ethyl acetate, butyl acetate, ethylene glycol monoethyl ether acetate, and propylene glycol methyl ether acetate; alcohols, such as methanol, ethanol, isopropanol, butanol, or n-propanol; and others organic compounds that present as liquid/fluid at typical reaction temperatures, such as dimethyl sulfoxide, dimethyl formamide, acetonitrile, tetrahydrofuran, white spirits, mineral spirits, naphtha, n-methylpyrrolidone; and the like, as well as derivatives, modifications, and combination thereof.

In certain embodiments, the reaction of components (A), (B), and (C) is carried out in the absence of any carrier vehicle or solvent. For example, no carrier vehicle or solvent may be combined discretely with the acryloxy-functional organosilicon component (A), the epoxy-functional acrylate component (B), the acrylate component (C), and/or the initiator (D). In these or other embodiments, none of components (A), (B), (C), and (D) are disposed in any carrier vehicle or solvent, such that no carrier vehicle or solvent is present in the reaction mixture during the polymerization (i.e., the reaction mixture is free from, alternatively substantially free from, solvents). The above notwithstanding, in certain embodiments, one or more of components (A), (B), and (C) may be a carrier, e.g. when utilized as a fluid in an amount sufficient to carry, dissolve, or disperse any other component(s) of the reaction mixture.

The amount of solvent (E) utilized can depend on various factors, including the type of solvent selected, the amount and type of components (A), (B), (C), and (D) employed, etc. Typically, the amount of solvent (E) may range from 0.1 to 99 wt. %, based on combined weights of components (A), (B), and (C). In some embodiments, the solvent (E) is utilized in an amount of from 1 to 99 wt. %, such as from 2 to 99, alternatively of from 2 to 95, alternatively of from 2 to 90, alternatively of from 2 to 80, alternatively of from 2 to 70, alternatively of from 2 to 60, alternatively of from 2 to 50 wt. %, based on combined weights of components (A), (B), and (C). In other embodiments, the solvent (E) is utilized in an amount of from 50 to 99 wt. %, such as from 60 to 99, alternatively of from 70 to 99, alternatively of from 80 to 99, alternatively of from 90 to 99, alternatively of from 95 to 99 wt. %, based on combined weights of components (A), (B), and (C).

In certain embodiments, the acryloxy-functional organosilicon component (A) and the epoxy-functional acrylate component (B), and optionally the acrylate component (C), are reacted in the presence of (F) a chain-transfer agent to prepare the silicone-acrylate polymer. Compounds suitable for use in or as the chain-transfer agent (F) (i.e., in a radical polymerization of the acryloxy-functional monomers of components (A), (B), and (C)) are known in the art, and are exemplified by various thiol compounds.

For example, in some embodiments, the chain-transfer agent (F) comprises, alternatively is, a thiol compound having the general formula X—SH, where X is selected from substituted and unsubstituted hydrocarbon moieties, organosilicon moieties, and combinations thereof, such as any of those described above with respect to R. Examples of such thiol compounds include dodecylmercaptan (i.e., dodecanethiol), 2-mercaptoethanol, butylmercaptopropionate, methylmercaptopropionate, mercaptopropionic acid, and the like, as well as combinations thereof. Other examples of thiol compounds suitable for the chain-transfer agent (F) include mercaptotrialkoxy silanes, mercaptodialkoxy silanes, and mercaptomonoalkoxy silanes. For example, in some embodiments, the chain-transfer agent (F) comprises, alternatively is, $(H_3CO)_2(H_3C)Si(CH_2)_3SH$. In these or other embodiments, the chain-transfer agent (F) comprises, alternatively is, dodecanethiol.

The chain-transfer agent (F) is typically utilized to terminate growing polymer chains (e.g. formed via the polymerization of the monomers of components (A), (B), and (C)), and initiate formation of new polymer chains. In this fashion the chain-transfer agent (F) may be utilized to both control the molecular weight of the silicone-acrylate polymer being prepared, as well as to select the end-functionalization of the polymer chains. For example, when the chain-transfer agent (F) comprises dodecanethiol, the silicone-acrylate polymer being prepared may comprise the following general formula:

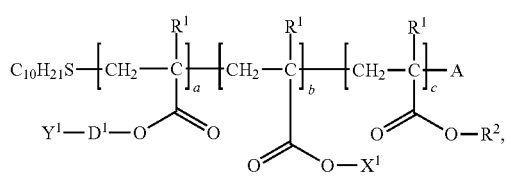

(I)

where A is a terminating group (e.g. H, or a moiety derived from a reactant or component of the reaction, such as one of the monomers of components (A), (B), or (C), the initiator (D), the chain-transfer agent (F), etc.), and each $Y^1$, $D^1$, $X^1$, $R^1$, $R^2$ subscript a, subscript b, and subscript c are independently selected and as defined above.

In certain embodiments, the chain-transfer agent (F) is utilized in the reaction in an amount of from 0.1 to 20 wt. %, based on the total amount of one of components (A), (B), and (C) utilized (i.e., wt./wt.). For example, the chain-transfer agent (F) may be used in an amount of from 0.1 to 15 wt. %, such as in an amount of from 0.5 to 15, alternatively from 1 to 15, alternatively from 5 to 15 wt. %, based on the total amount of one of components (A), (B), and (C) utilized. In other embodiments, the chain-transfer agent (F) is utilized in the reaction in an amount of from 0.01 to 20 wt. % based on the total amount of components (A), (B), and (C) utilized, such as in an amount of from 0.1 to 20, alternatively from 1 to 20, alternatively from 1 to 15, alternatively from 5 to 15 wt. %, based on the total amount of components (A), (B), and (C). It will be appreciated that ratios outside of these ranges may be utilized as well, and the chain-transfer agent (F) may be utilized in one or more portions, each within one of the ranges above (e.g. such as when additional the chain-transfer agent (F) is utilized during the reaction of components (A), (B), and (C) to reach or otherwise move toward completion. It is also to be appreciated that the chain-transfer agent (F) may itself comprise more than one type of compounds suitable for acting/functioning as a chain-transfer agent, such as two, three, or more different such compounds, which may be individually or collectively utilized in an amount within one of the ranges above.

In general, reacting components (A), (B), and (C) (i.e., when utilized) comprises combining the acryloxy-functional organosilicon component (A) and the epoxy-functional acrylate component (B), and optionally the acrylate component (C), in the presence of the initiator (D) and/or other components of the reaction (e.g. the chain transfer agent (F), the solvent (E), etc.) (collectively, the "reaction components"). Said differently, there is generally no proactive step required for the reaction beyond combining the components together. As introduced above, the reaction may be generally defined or otherwise characterized as a radical polymerization reaction, and certain parameters and conditions of the reaction may be selected by those known in the art of such reactions in order to prepare the silicone-acrylate polymer.

Typically, the reaction components are reacted in a vessel or reactor to prepare the silicone-acrylate polymer. When the reaction is carried out at an elevated or reduced temperature as described below, the vessel or reactor may be heated or cooled in any suitable manner, e.g. via a jacket, mantle, exchanger, bath, coils, etc.

Any of the reaction components may be fed together or separately to the vessel, or may be disposed in the vessel in any order of addition, and in any combination. Typically, however, the initiator (D) will be combined with monomer-containing components (e.g. components (A), (B), and/or (C) only when the reaction is to be initiated, as will be understood by those of skill in the art. In certain embodiments, components (B) and (C) are added to a vessel containing component (A). In such embodiments, components (B) and (C) may be first combined prior to the addition, or may be added to the vessel sequentially (e.g. (C) then (B)). In certain embodiments, component (D) is added to a vessel containing components (A) and (B), either as a premade catalyst/initiator, or as individual components to form the initiator (D) in situ. In general, reference to the "reaction mixture" herein refers generally to a mixture comprising the reaction components, i.e., components (A), (B), and (D), and optionally components (C), (E), and/or (F) if utilized (e.g. as obtained by combining such components, as described above).

The reaction components can be reacted at various molar ratios, depending on the particular silicone-acrylate polymer being prepared (e.g. with respect to formula (I) above, the particular values and/or ratios of subscripts a, b, and c desired). In addition, the molar ratios between the components will depend on the active concentration of reactive molecules therein, e.g. the amount of acryloxy-functional organosilicon monomer in the acryloxy-functional organosilicon component (A), etc. As such, the molar ratios of components in the reaction will typically be selected based on the amount of reactive monomers being utilized. For example, in certain embodiments, the polymerization method comprises disposing components (A) and (B) in the reaction mixture in amounts sufficient to react the acryloxy-functional organosilicon monomer and the oxiranyl acrylate ester monomer in a ratio of from 10:1 to 1:10, such as from 8:1 to 1:8, alternatively from 6:1 to 1:6, alternatively from 4:1 to 1:4, alternatively from 2:1 to 1:2, alternatively of 1:1 (A):(B). In these or other embodiments, the polymerization method comprises disposing components (A) and (C) in the reaction mixture in amounts sufficient to react the acryloxy-functional organosilicon monomer and the acrylic ester monomer in a ratio of from 10:1 to 1:10, such as from 8:1 to 1:8, alternatively from 6:1 to 1:6, alternatively from 4:1 to 1:4, alternatively from 2:1 to 1:2, alternatively of 1:1 (A):(C). In these or other embodiments, the polymerization method comprises disposing components (B) and (C) in the reaction mixture in amounts sufficient to react the oxiranyl acrylate ester monomer and the acrylic ester monomer in a ratio of from 10:1 to 1:10, such as from 8:1 to 1:8, alternatively from 6:1 to 1:6, alternatively from 4:1 to 1:4, alternatively from 2:1 to 1:2, alternatively of 1:1 (B):(C). However, ratios outside these ranges may also be utilized, and one of skill in the art will select the particular ratios utilized, e.g. in view of the particular silicone-acrylate polymer being prepared, the particular monomers utilized, etc. For example, when more than one acryloxy-functional organosilicon monomer is utilized, each of such monomers may be utilized in one of the ratios above.

The components of the reaction may be utilized in any form (e.g. neat (i.e., absent solvents, carrier vehicles, diluents, etc.), disposed in a carrier vehicle, etc.) and may be obtained or formed. For example, as set forth above, each compound or component may be provided "as is", i.e., ready for the reaction to prepare the silicone-acrylate polymer. Alternatively, one or more components may be formed prior to or during the reaction. For example, in some embodiments, the method comprises preparing the acryloxy-functional organosilicon component (A), the epoxy-functional acrylate component (B), and/or the acrylate component (C).

The method may further comprise agitating the reaction mixture during and/or after formation. The agitating may enhance mixing and contacting together the reaction components when combined, e.g. in the reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., polymerization), of components (A), (B), and (C) to form the silicone-acrylate polymer. Other conditions may be result-effective conditions for enhancing reaction yield or minimizing amount of a particular reaction by-product included within the reaction product along with the silicone-acrylate polymer.

In some embodiments, the reaction is carried out at an elevated temperature. The elevated temperature will be selected and controlled depending on the particular reaction components, selected, the reaction parameters employed, etc., the reaction vessel utilized (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 250° C., such as from 30 to 225, alternatively from 40 to 200, alternatively from 50 to 200, alternatively from 50 to 180, alternatively from 50 to 160, alternatively from 50 to 150, alternatively from 60 to 150, alternatively from 70 to 140, alternatively from 80 to 130, alternatively from 90 to 120, alternatively from 100 to 120° C. In certain embodiments, the elevated temperature is selected and/or controlled based on the boiling point of the solvent (E), such as when utilizing refluxing conditions.

It is to be appreciated that the elevated temperature may also differ from the ranges set forth above, e.g. when both elevated temperature and a reduced or elevated pressure are utilized, and other or alternative reaction conditions may be employed. For example, in certain embodiments, a reduced or elevated pressure is utilized in order to maintain reaction progression while utilizing a lower reaction temperature, which may lead to a decrease in the formation of undesirable byproducts (e.g. degradation, and/or decomposition byproducts). Likewise, it is also to be appreciated that reaction parameters may be modified during the reaction of the reaction components. For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.). Oxygen may optionally be removed from the reaction during the polymerization method, e.g. by bubbling nitrogen or another inert gas into the vessel.

The time during which the reaction to prepare the silicone-acrylate polymer is carried out is a function of scale, reaction parameters and conditions utilized, the reaction components selected, etc. On a relatively large scale (e.g. greater than 1, alternatively 5, alternatively 10, alternatively 50, alternatively 100 kg), the reaction may be carried out for hours, such as from 2 to 240, alternatively from 2 to 120, alternatively from 2 to 96, alternatively from 2 to 72, alternatively from 2 to 48, alternatively from 2 to 36, alternatively from 2 to 24, alternatively from 2 to 12, alternatively for a duration of 3, 4, 5, 6, 12, 18, 24, 36, or 48 hours, as will be readily determined by one of skill in the art (e.g. by monitoring conversion of components (A), (B), and/or (C), production of the silicone-acrylate polymer, etc., such as via chromatographic and/or spectroscopic methods). In certain embodiments, the time during which the reaction is carried out is from greater than 0 to 240 hours, alternatively from 1 to 120 hours, alternatively from 1 to 96 hours, alternatively from 1 to 72 hours, alternatively from 1 to 48 hours, alternatively from 1 to 36 hours, alternatively from 1 to 24 hours, alternatively from 1 to 12 hours, alternatively from 2 to 12 hours, alternatively from 2 to 8 hours, after the reaction components are combined.

Generally, the reaction of components (A), (B), and (C) prepares a reaction product comprising the silicone-acrylate polymer (I). In particular, over the course of the reaction, the reaction mixture comprises increasing amounts of the silicone-acrylate polymer (I) being prepared and decreasing amounts of the monomers of components (A), (B), and (C) utilized in the reaction. Once the reaction is complete (e.g. one or more of components (A), (B), and (C) is consumed, no additional silicone-acrylate polymer (I) is being prepared, etc.), the reaction mixture may be referred to as the reaction product comprising the silicone-acrylate polymer (I). In this fashion, the reaction product typically includes any remaining amounts of the reaction components, as well as degradation and/or reaction products thereof. If the reaction is carried out in any carrier vehicle or solvent (e.g. solvent (E)), the reaction product may also include such carrier vehicle or solvent.

In certain embodiments, the method further comprises isolating and/or purifying the silicone-acrylate polymer (I) from the reaction product. As used herein, isolating the silicone-acrylate polymer (I) is typically defined as increasing the relative concentration of the silicone-acrylate polymer (I) as compared to other compounds in combination therewith (e.g. in the reaction product or a purified version thereof). As such, as is understood in the art, isolating/purifying may comprise removing the other compounds from such a combination (i.e., decreasing the amount of impurities combined with the silicone-acrylate polymer (I), e.g. in the reaction product) and/or removing the silicone-acrylate polymer (I) itself from the combination. Any suitable technique and/or protocol for isolation may be utilized. Examples of suitable isolation techniques include distilling, stripping/evaporating, extracting, filtering, washing, partitioning, phase separating, chromatography, and the like. As will be understood by those of skill in the art, any of these techniques may be used in combination (i.e., sequentially) with any other technique to isolate the silicone-acrylate polymer (I). It is to be appreciated that isolating may include, and thus may be referred to as, purifying the silicone-acrylate polymer (I). However, purifying the silicone-acrylate polymer (I) may comprise alternative and/or additional techniques as compared to those utilized in isolating the silicone-acrylate polymer (I). Regardless of the particular technique(s) selected, isolation and/or purification of silicone-acrylate polymer (I) may be performed in sequence (i.e., in line) with the reaction itself, and thus may be automated. In other instances, purification may be a stand-alone procedure to which the reaction product comprising the silicone-acrylate polymer (I) is subjected.

The silicone-acrylate polymer (I) prepared via the polymerization method is the reaction product the reaction components utilized (e.g. each acryloxy-functional organosilicon monomer of component (A), each oxiranyl acrylate ester monomer of component (B), each acrylic ester monomer of component (C), each radical-polymerization active compound of component (D), and each thiol compound or the like of component (F), when such components are utilized). As such, it is to be appreciated that many variations and particular species of the silicone-acrylate polymer (I) may be prepared, e.g. depending on the particular reaction components selected and reaction conditions employed. However, the silicone-acrylate polymer (I) prepared by the polymerization method corresponds to the general average unit formula (I) set forth above.

As introduced above, component (II) of the composition is an aminosiloxane. In general, the aminosiloxane (II) comprises, alternatively is, an amine-functional polysiloxane having a silicone backbone and an average of at least two amine functional groups per molecule. The amine functional groups may be located anywhere along the silicone backbone, such as in terminal positions, pendant positions, or both. The amine functional groups are configured to be reactive with the epoxide groups of the silicone-acrylate polymer (I) (i.e., those present in the epoxide-functional moieties $X^1$ described above), such that the silicone-acrylate polymer (I) and the aminosiloxane (II) may be reacted together (e.g. in a cross-linking reaction) to prepare a cured/networked product therefrom. Aside from the amine functional groups, the aminosiloxane (II) is not particularly limited, and may comprise any combination of [M], [D], [T] and/or [Q] siloxy units, as such units are described above, so long as the aminosiloxane (II) includes an average of at least two amine functional groups per molecule. The siloxy units of the aminosiloxane (II) can be combined in various manners to form cyclic, linear, branched and/or resinous (e.g. three-dimensional networked) structures, i.e., in the silicone backbone. As such, the silicone backbone of the aminosiloxane (II) may be monomeric, polymeric, oligomeric, linear, branched, cyclic, and/or resinous depending on the selection of [M], [D], [T] and/or [Q] units therein. Likewise, the aminosiloxane (II) itself may be generally linear, branched, partly branched, cyclic, resinous (i.e., have a three-dimensional network), or may comprise a combination of different structures.

In general, the aminosiloxane (II) may have the fully condensed formula: $R^8_i SiO_{(4-i)/2}$, where each $R^8$ is independently selected from hydrocarbyl groups, alkoxy and/or aryloxy groups, and amine groups, with the proviso that in each molecule, an average of at least two of $R^8$ each include an amine group, and where subscript i is selected such that $0 < i \le 3.5$. In certain embodiments, the aminosiloxane (II) may have the general average unit formula $[R^8_i SiO_{(4-i)/2}]_h$, where: subscript $h \ge 1$; subscript i is independently selected from 1, 2, and 3 in each moiety indicated by subscript h, with the proviso that $h+i>2$; and each $R^8$ is independently selected from hydrocarbyl groups, alkoxy and/or aryloxy groups, siloxy groups, and amine groups (i.e., such as any of those described above), with the proviso that an average of at least two $R^8$ are amine groups per molecule of the aminosiloxane (II).

Suitable hydrocarbyl groups, alkoxy groups, and aryloxy groups for $R^8$ are as described above with respect to R, and suitable amine groups for $R^8$ include any of the hydrocarbyl or alkoxy groups described above substituted with a primary or secondary amine group (i.e., an epoxide-reactive amine group). In certain embodiments, each $R^8$ is independently selected from hydrocarbyl groups, alkoxyaryloxy groups, and amine groups. In certain embodiments, each $R^8$ is independently selected from alkyl groups having from 1 to 20 carbon atoms (e.g. methyl, ethyl, and propyl groups (i.e., n-propyl and isopropyl groups), etc.), aryl groups having from 6 to 20 carbon atoms (e.g. phenyl groups, etc.), and halogenated alkyl groups having from 1 to 20 carbon atoms (e.g. chloromethyl, chloropropyl, and trifluoropropyl groups, etc.), and amine groups. In specific embodiments, each $R^8$ that is not an amine group is a methyl group.

The average unit formula above for the aminosiloxane (II) may be alternatively written as $[R^8_3 SiO_{1/2}]_x [R^8_2 SiO_{2/2}]_y [{}^8 SiO_{3/2}]_z [SiO_{4/2}]_w$, where $R^8$ is as defined above, and subscripts x, y, z, and w are each mole fractions representing [M], [D], [T] and [Q] units, respectively, such that $x+y+z+w=1$, with the proviso that $x+y+z>0$. One of skill in the art understands how such [M], [D], [T] and [Q] units and their molar fractions influence subscripts x, y, z, and w in the average unit formula above. For example, [T] units (e.g. indicated by subscript z) and/or [Q] units (e.g. indicated by subscript w) are typically present in aminosiloxane resins, whereas [D] units indicated by subscript x, are typically present in aminosiloxane polymers. However, such [D] units may also be present in aminosiloxane resins and branched aminosiloxanes. In certain embodiments, the aminosiloxane (II) is substantially free from, alternatively is free from, [Q] units (e.g. where subscript w is 0), such that the aminosiloxane (II) has the following general formula:

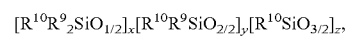
$[R^{10}R^9_2 SiO_{1/2}]_x [R^{10}R^9 SiO_{2/2}]_y [R^{10} SiO_{3/2}]_z$, where each $R^9$ is an independently selected monovalent hydrocarbyl group; each $R^{10}$ is independently $R^9$ or an amino-functional hydrocarbon group; and subscripts x, y, and z are each mole fractions such that $x+y+z=1$, with the provisos that $0 \le x < 1$, $0 < y < 1$, $0 \le z < 1$, and the aminosiloxane (II) comprises an average of at least two $R^{10}$ that are amino-functional hydrocarbon groups per molecule. Monovalent hydrocarbon groups suitable for $R^9$ are exemplified by alkyl groups having from 1 to 6 carbon atoms, aryl groups having from 6 to 10 carbon atoms, halogenated alkyl groups having from 1 to 6 carbon atoms, halogenated aryl groups having from 6 to 10 carbon atoms, aralkyl groups having from 7 to 12 carbon atoms, and halogenated aralkyl groups having from 7 to 12 carbon atoms, where alkyl, aryl, and halogenated alkyl, aralkyl, etc., are described and exemplified above. In some embodiments, each $R^9$ is an alkyl group. For example, in certain embodiments, each $R^9$ is independently methyl, ethyl or propyl. It will be appreciated, however, that each $R^9$ may be selected to be the same as or different from any other $R^9$, e.g. in terms of which group the particular $R^9$ represents. In some embodiments, however, each $R^9$ is a methyl group.

In certain embodiments, the aminosiloxane (II) may be substantially linear, alternatively is linear. In such embodiments, the aminosiloxane (II) may have the condensed formula: $R^8_i SiO_{(4-i)/2}$, where each $R^8$ is independently selected and as defined above, and where subscript i is selected such that 1.9 s is 2.2. Such linear examples of the aminosiloxane (II) may present as a flowable liquid under ambient conditions (e.g. at 25° C.), e.g. such as when the aminosiloxane (II) comprises a viscosity of from 10 to 30,000,000 mPa-s, such as from 10 to 10,000,000 alternatively from 100 to 1,000,000, alternatively from 100 to 100,000 mPa-s at 25° C. (e.g. as determined via viscometer, such as a Brookfield LV DV-E viscometer equipped with an appropriate spindle).

When substantially linear or linear, the aminosiloxane (II) may be substantially free from, alternatively free from, both

[T] and [Q] units (e.g. where subscripts z and w are each 0), such that the aminosiloxane (II) has the average unit formula:

$$[R^{10}R^9{}_2SiO_{1/2}]_{x'}[R^{10}R^9SiO_{2/2}]_{y'}[R^9{}_2SiO_{3/2}]_{y''}[R^9{}_3SiO_{1/2}]_{x''},$$

where each $R^9$ is an independently selected monovalent hydrocarbon group; each $R^{10}$ is an amino-functional group; subscripts x' and x" are each independently 0, 1, or 2; subscript y' is ≥0; and subscript y" is ≥0, with the provisos that x'+x"≥2, x'+y'≥2, and y'+y"≥1. In such embodiments, x'+x"+y'+y" is generally from 3 to 2,000. For example, in some embodiments, subscript y" may be from 0 to 1000, alternatively from 1 to 500, alternatively from 1 to 200. In these or other embodiments, subscript y' is from 2 to 500, alternatively from 2 to 200, alternatively from 2 to 100. In such embodiments, x' and x" are each typically from 0 to 10, such as from 2 to 6.

The amine functional groups of the aminosiloxane (II), e.g. represented by $R^{10}$ in the preceding average unit formula are capable of forming a N—C bond with an oxyranyl carbon atom of the silicone-acrylate polymer (I) (i.e., those present in the epoxide-functional moieties $X^1$ described above), and are otherwise not particularly limited. Suitable amine functional groups groups for $R^{10}$ are exemplified by aminoalkyl, aminoaryl, aminoalkaryl, and aminoaralkyl groups bonded directly to a silicon atom of the siloxane backbone of the aminosiloxane (II), or to an oxygen bonded to such a silicon atom (e.g. as an aminoalkoxy group, an aminoaryloxy group, etc.).

When the aminosiloxane (II) is substantially linear, alternatively is linear, the at least two amine functional groups may be bonded to silicon atoms in pendent positions, terminal positions, or in both pendent and terminal locations. As a specific example, where each $R^9$ is methyl, the aminosiloxane (II) may have but only pendant amine functional groups and thus comprise the following average unit formula:

$$[(CH_3)_3SiO_{1/2}]_2[(CH_3)R^{10}SiO_{2/2}]_{y'}[(CH_3)_2SiO_{2/2}]_{y''},$$

where subscripts y' and y" are defined above, with the proviso that y' is ≥2, and each $R^{10}$ is an independently selected amine functional group as defined and described above. With regard to this average unit formula, any methyl group may be replaced with a different monovalent hydrocarbon group (such as alkyl or aryl). Alternatively, the aminosiloxane (II) may have but only terminal amine functional groups, and thus comprise the following average formula:

$$R^{10}(CH_3)_2SiO[(CH_3)_2SiO]_{y''}Si(CH_3)_2R^{10},$$

where subscript y" and $R^{10}$ are as defined above. With regard to this average formula, where the aminosiloxane (II) may be defined or otherwise described as a dimethyl polysiloxane terminated with amine functional groups, it is to be appreciated that any methyl group may be replaced with a different monovalent hydrocarbon group, and each $R^{10}$ may be any of the amine functional groups described herein. Alternatively, the aminosiloxane (II) may have both terminal and pendent amine functional groups, and thus comprise the following average unit formula:

$$[R^{10}(CH_3)_2SiO_{1/2}]_{x'}[R^{10}(CH_3)SiO_{2/2}]_{y'}[(CH_3)_2SiO_{2/2}]_{y''},$$

where each of subscripts x', y', y", and $R^{10}$ are as defined above.

When the aminosiloxane (II) is the substantially linear polyorganosiloxane, the aminosiloxane (II) can be exemplified by a dimethylpolysiloxane capped at both molecular terminals with amino-functional dimethylsiloxy groups, a methylphenylpolysiloxane capped at both molecular terminals with amino-functional dimethylsiloxy groups, a copolymer of a methylphenylsiloxane and dimethylsiloxane capped at both molecular terminals with amino-functional dimethylsiloxy groups, a copolymer of a dimethylsiloxane and diphenylsiloxane capped at both molecular terminals with amino-functional dimethylsiloxy groups, a copolymer of a dimethylsiloxane, methylphenylsiloxane, and diphenylsiloxane capped at both molecular terminals with amino-functional dimethylsiloxy groups, a copolymer of an amino-functional methylsiloxane and a methylphenylsiloxane capped at both molecular terminals with trimethylsiloxy groups, a copolymer of an amino-functional methylsiloxane and a diphenylsiloxane capped at both molecular terminals with trimethylsiloxy groups, and a copolymer of an amino-functional methylsiloxane, methylphenylsiloxane, and a dimethylsiloxane capped at both molecular terminals with trimethylsiloxy groups.

In certain embodiments, the aminosiloxane (II) may comprise, alternatively may be, or be characterized as, a resinous polyorganosiloxane comprising a molecular structure that is branched or otherwise includes a three dimensional network. In such embodiments, the resinous aminosiloxane (II) may be in a liquid or in a solid form at 25° C. In such embodiments, the resinous aminosiloxane (II) may have the condensed formula: $R^8{}_iSiO_{(4-i)/2}$, where each $R^8$ is independently selected and as defined above, and where subscript i is selected such that 0.5≤i≤1.7.

In general, the resinous aminosiloxane (II) may be exemplified by amino-functional polyorganosiloxanes that comprises only [T] units, [T] units in combination with other siloxy units (e.g. [M], [D], and/or [Q] siloxy units), or [Q] units in combination with other siloxy units (i.e., [M], [D], and/or [T] siloxy units). Typically, the resinous aminosiloxane (II) comprises [T] and/or [Q] units. Specific examples of the resinous aminosiloxane (II) include a amino-terminated silsesquioxanes (i.e., [T] resins) and amino-terminated MDQ resins. In particular embodiments, the resinous aminosiloxane (II) comprises a branched organopolysiloxane having the amine functional groups bonded to the silicon atoms in [M] siloxy units.

In certain embodiments, the aminosiloxane (II) may comprise a branched siloxane, a silsesquioxane, or both a branched siloxane and a silsesquioxane. When branched, the aminosiloxane (II) may have the average unit formula:

$$[R^{10}R^9{}_2SiO_{1/2}]_{x'}[R^9{}_3SiO_{1/2}]_{x''}[R^9{}_2SiO_{2/2}]_{y''}[SiO_{4/2}]_w,$$

where each $R^9$ is independently a monovalent hydrocarbon group or a monovalent halogenated hydrocarbon group and each $R^{10}$ is an amine functional group, both of which are otherwise as described above, subscript x'≥2, subscript x"≥0, 15≥y"≥1000, and subscript w is >0. For example, in such embodiments, with regard to the preceding average unit formula, subscript x" is ≥0, alternatively x" is >0, alternatively, subscript x' is ≥3. Subscript y" is from 15 to 995. Subscript w is >0. Alternatively, subscript w≥1. In some embodiments, for subscript x": 22≥x"≥0; alternatively 20≥x"≥0; alternatively 15≥x"≥0; alternatively 10≥x"≥0; and alternatively 5≥x"≥0. In some embodiments, for subscript x': 22≥x'>0; alternatively 22≥x'≥4; alternatively 20≥x'>0; alternatively 15≥x'>1; alternatively 10≥x'≥2; and alternatively 15≥x'≥4. For subscript y": 800≥y"≥15, alternatively 400≥y"≥15. In some embodiments, for subscript w: 10≥w>0; alternatively, 10≥w≥0; alternatively 5≥w>0; and alternatively w=1. In some embodiments, subscript w is 1 or 2. Alternatively, when subscript w=1, subscript x" may be 0 and subscript x' may be 4.

In some embodiments, the aminosiloxane (II) may have the average unit formula: $[R^{10}R^9{}_2SiO_{1/2}]_{x'}[R^9{}_3SiO_{1/2}]_{x''}$ $[R^9{}_2SiO_{2/2}]_{y''}[R^9SiO_{3/2}]_z$, where $R^9$ and $R^{10}$ are as described above, subscript x" is ≥0, subscript x' is >0, subscript y" is from 15 to 995, and subscript z is >0. Subscript x" may be from 0 to 10. In some embodiments, for subscript x": 12≥x"≥0; alternatively 10≥x"≥0; alternatively 7≥x"≥0; alternatively 5≥x"≥0; and alternatively 3≥x"≥0. In these or other embodiments, subscript x' is ≥1, alternatively x' is ≥3. In some embodiments, for subscript x': 12≥x'>0; alternatively 12≥x'≥3; alternatively 10≥x'>0; alternatively 7≥x'>1; alternatively 5≥x'≥2; and alternatively 7≥x'≥3. In certain embodiments, for subscript y": 800≥y"≥15; and alternatively 400≥y"≥15. In these or other embodiments, subscript z is ≥1. Alternatively, subscript z is 1 to 10. In certain embodiments, for subscript z: 10≥z>0; alternatively 5≥z>0; and alternatively z=1. In certain embodiments, subscript z is from 1 to 10, alternatively is a value of 1 or 2. In some embodiments, when subscript z=1, subscript x' may be 3 and subscript x" may be 0. The values for subscript x' may be sufficient to provide the aminosiloxane (II) of the preceding average unit formula with an amine-functionalized content of 0.1% to 1%, alternatively 0.2% to 0.6%, based on the weight of the aminosiloxane (II).

With regard to the silicon-bonded substituents represented in the various formulae above, e.g. by each $R^8$ that is not an amine group, each $R^{10}$, etc., the aminosiloxane (II) may be characterized in terms of content of any particular substituent. For example, as will be understood by those of skill in the art, the aminosiloxane (II) may be characterized in terms of methyl content (i.e., the number or proportion of each $R^8$, $R^{10}$, etc. that is a methyl group), phenyl content (i.e., the number or proportion of each $R^8$, $R^{10}$, etc. that is a phenyl group), etc. In certain embodiments, for example, the aminosiloxane (II) has a high methyl content, such as a methyl content of at least 90, alternatively at least 95, alternatively at least 98, alternatively at least 99, alternatively at least 99.5, alternatively at least 99.9, alternatively at least 99.99%, based on the total number of silicon-bonded substituents that are not the amine groups. In particular embodiments, the aminosiloxane (II) has a low phenyl content, such as a phenyl content of less than 10, alternatively less than 5, alternatively less than 2, alternatively less than 1, alternatively less than 0.5, alternatively less than 0.1, alternatively less than 0.01%, based on the total number of silicon-bonded substituents that are not the amine groups.

In general, the particular silicone-acrylate polymer (I) and aminosiloxane (II) utilized in the composition are not limited aside from the parameters and characteristics described herein. In certain embodiments, however, the silicone-acrylate polymer (I) and aminosiloxane (II) are selected in view of each other, e.g. based on the compatibility of the components with each other. For example, in some embodiments, the silicone-acrylate polymer (I) and aminosiloxane (II) are selected to give a transparent liquid when combined. More particularly, in such embodiments, the aminosiloxane (II) is compatible, alternatively is miscible with the silicone-acrylate polymer (I). In particular examples of these embodiments, the aminosiloxane (II) is compatible, alternatively is miscible with the silicone-acrylate polymer (I) at room temperature. In other such embodiments, the transparent liquid form may be achieved by combining together components (I) and (II) and subsequently heating the combination (e.g. at a mildly elevated temperature, such as from greater than room temperature to less than 150, alternatively less than 125, alternatively less than 100, ° C.) to compatibilize components (I) and (II), and then cooling or otherwise allowing the composition to cool to room temperature to give the transparent liquid.

The relative amounts of the components (I) and (II) utilized in the composition may vary, e.g. based upon the particular silicone-acrylate polymer (I) selected and/or prepared, the aminosiloxane (II) selected, etc. In certain embodiments, an excess (e.g. molar and/or stoichiometric) of one of components (I) and (II) is utilized to maximize the cross-linking of the silicone-acrylate polymer (I) and/or to fully consume the aminosiloxane (II). In general, the silicone-acrylate polymer (I) and the aminosiloxane (II) are utilized in the composition in a molar ratio of from 10:1 to 1:10, alternatively from 8:1 to 1:8, alternatively from 6:1 to 1:6, alternatively from 4:1 to 1:4, alternatively from 2:1 to 1:2, alternatively 1:1, (I):(II). It will be appreciated, however, that ratios outside of the specific ranges above may also be utilized. For example, in certain embodiments, the aminosiloxane (II) is utilized in a gross excess (e.g. in an amount of ≥5, alternatively ≥10, alternatively ≥15, alternatively ≥20, times the stoichiometric amount of cross-linkable groups of the silicone-acrylate polymer (I)), such as when the aminosiloxane (II) is utilized as a carrier (i.e., a solvent, diluent, etc.), e.g. for subsequent removal. Regardless, one of skill in the art will readily select the particular amounts and ratios of the various components to prepare the copolymer according to the embodiments described herein, including the theoretical maximum reactivity ratios described above, the presence or exclusion of any carrier vehicle(s), the particular components utilized, etc.

In certain embodiments, the silicone-acrylate polymer (I) and the aminosiloxane (II) are utilized in a stoichiometric ratio of from 10:1 to 1:10, alternatively from 8:1 to 1:8, alternatively from 6:1 to 1:6, alternatively from 4:1 to 1:4, alternatively from 2:1 to 1:2, alternatively of 1:1, alternatively of 1:0.8, $[X^1]$:[NH], where $[X^1]$ represents the number of epoxide moieties $X^1$ of the silicone-acrylate polymer (I) and [NH] represents the number of amine functional groups of the aminosiloxane (II), (i.e., the number of amine-functional $R^8$, $R^{10}$, etc. in myriad embodiments described above), which is generally at least 2. More specifically, as understood by those of skill in the art, the cross-linking of the silicone-acrylate polymer (I) with the aminosiloxane (II) occurs at a theoretical maximum based on the number of cross-linkable groups $X^1$ present within the silicone-acrylate polymer (I). In particular, with reference to general formula (I) of the silicone-acrylate polymer (I) above, each epoxide-functional moiety designated by $X^1$ can be reacted with one of the amine functional groups of the aminosiloxane (II), of which there is an average, per molecule, of at least two, such that one molar equivalent of the aminosiloxane (II) is needed for every two epoxide-functional moieties designated by $X^1$ of the silicone-acrylate polymer (I) to achieve a theoretically complete (i.e., maximum) cross-linking reaction. Likewise, the theoretical maximum stoichiometric ratio of the reaction of the silicone-acrylate polymer (I) with the aminosiloxane (II) is 1:1 $[X^1]$:[NH], i.e., where a molecule of the aminosiloxane requires two amine groups to cross-link two molecules of the epoxide-functional moiety, which each require one epoxide group to participate in the reaction.

In particular embodiments, the silicone-acrylate polymer (I) and the aminosiloxane (II) are utilized in a stoichiometric ratio of from 0.75:1 to 2.5:1 [NH]:$[X^1]$, such as from 0.75:1 to 2.25:1, alternatively from 0.75:1 to 2:1, alternatively from 0.75:1 to 1.75:1, alternatively from 0.75:1 to 1.5:1. [NH]:

[X¹]. As will be understood in the art, the ratio [NH]:[X¹] may be referred to as the cure stoichiometry of the curable composition, may be defined as the molar ratio of active amine hydrogens to epoxy groups attributable to the aminosiloxane (II) and silicone-acrylate polymer (I), respectively.

In certain embodiments, the composition further comprises one or more additional components, such as one or more additives (e.g. agents, adjuvants, ingredients, modifiers, auxiliary components, etc.) aside from components (I) and (II).

In some embodiments, for example, the composition comprises a carrier vehicle. The carrier vehicle is not limited as is typically selected for based on the particular silicone-acrylate polymer (I) and/or aminosiloxane (II) selected, a desired end use of the composition, etc. In general, the carrier vehicle comprises, alternatively is, a solvent, a fluid, an oil (e.g. an organic oil and/or a silicone oil), etc., or a combination thereof.

In some embodiments, the carrier vehicle comprises an organic solvent. Examples of organic solvents include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; an acetate, such as ethyl acetate, butyl acetate, ethylene glycol monoethyl ether acetate, and propylene glycol methyl ether acetate; a halogenated hydrocarbon, such as dichloromethane, 1,1,1-trichloroethane, and chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof. In certain embodiments, the carrier vehicle comprises a polar organic solvent, such as a solvent compatible with water. Specific examples of such polar organic solvents utilized in certain embodiments include methanol, ethanol, 1-propanol, 2-propanol, 2-methyl-2-propanol, 2-butanone, tetrahydrofuran, acetone, and combinations thereof.

In certain embodiments, the carrier vehicle comprises an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.), $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, acetates, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogentated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the carrier vehicle comprises a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm²/sec. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5\times10^{-7}$ to $1.5\times10^{-6}$ m²/s.

Other carrier vehicles may also be utilized. For example, in some embodiments, the carrier vehicle comprises an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl)imide, 1-vinylimidazolium.bis(trifluoromethanesulfonyl)imide, 1-allyl imidazolium bis(trifluoromethanesulfonyl)imide, 1-allyl-3-methylimidazolium bis(trifluoromethanesulfonyl)imide, lithium bis(trifluoromethanesulfonyl)imide, and the like, as well as derivatives, modifications, and combinations thereof.

The carrier vehicle may comprise a combination of different vehicles/solvents/diluents, etc., which may be miscible or immiscible with one another. For example, the composition itself may be homogenous or heterogeneous. The composition may also be in the form of an emulsion, such as a water-in-oil emulsion, silicone-in-oil emulsion, oil-in-water emulsion, oil-in-silicone emulsion, etc. Typically, however, the composition is homogeneous.

In particular embodiments, the curable composition is substantially free from, alternatively is free from, carrier vehicles, aside from components (I) and (II).

It is to be appreciated that additives suitable for use in the composition may be classified under numerous and different terms of art, and just because an additive is classified under such a term does not mean that it is thusly limited to that function. Moreover, some of additives may be present in a particular component of the composition (e.g. when a multi-component composition), or instead may be incorporated when forming the composition.

Typically, the composition may comprise any number of additives, e.g. depending on the particular type and/or function of the same in the composition. For example, in certain embodiments, the composition may comprise one or more additives comprising, alternatively consisting essentially of, alternatively consisting of: a filler; a filler treating agent; a surface modifier; a surfactant; a rheology modifier; a viscosity modifier; a binder; a thickener; a tackifying agent; an adhesion promotor; a defoamer; a compatibilizer; an extender; a plasticizer; an end-blocker; a reaction inhibitor; a drying agent; a water release agent; a colorant (e.g. a pigment, dye, etc.); an anti-aging additive; a biocide; a flame retardant; a corrosion inhibitor; a catalyst inhibitor; a UV absorber; an anti-oxidant; a light-stabilizer; a catalyst (e.g. other than the catalyst (C)), procatalyst, or catalyst generator; an initiator (e.g. a heat activated initiator, an electromagnetically activated initiator, etc.); a photoacid generator; a heat stabilizer; and the like, as well as derivatives, modifications, and combinations thereof.

In certain embodiments, the composition comprises a filler, such as electrically and/or thermally conductive or non-conductive fillers, mineral filler, etc. Examples of electrically conductive fillers include those comprising a metal or a conductive non-metal, or metal or non-metal particles having an outer surface of a metal (e.g. a noble metal such as silver, gold, platinum, palladium, and alloys thereof, or a base metal such as nickel, aluminum, copper, or steel), including those also comprising a core of particles consisting of copper, solid glass, hollow glass, mica, nickel, ceramic fiber, or polymerics such as polystyrene, polymethylmethacrylate, etc. Example of thermally conductive fillers include those comprising aluminum, copper, gold, nickel, silver, alumina, magnesium oxide, beryllium oxide, chromium oxide, titanium oxide, zinc oxide, barium titanate, diamond, graphite, carbon or silicon nano-sized particles, boron nitride, aluminum nitride, boron carbide, titanium carbide, silicon carbide, and tungsten carbide. Examples of mineral fillers include titanium dioxide, aluminum trihydroxide (also called ATH), magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminum oxide, antimony pentoxide, antimony trioxide, beryllium oxide, chromium oxide, iron oxide, lithopone, boric acid or a borate salt such as zinc borate, barium metaborate or aluminum borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminum flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, ceramic or glass beads, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulphide, wollastonite, and the like, as well as derivatives, modifications, and combinations thereof.

In certain embodiments, the composition comprises one or more reinforcing fillers, non-reinforcing fillers, or a mixture thereof. Examples of reinforcing fillers include finely divided fillers such as high surface area fumed and precipitated silicas, including rice hull ash and, to a degree, calcium carbonate. Examples of non-reinforcing fillers include finely divided fillers such as crushed quartz, diatomaceous earths, barium sulphate, iron oxide, titanium dioxide, carbon black, talc, and wollastonite. Other fillers which might be used alone or in addition to those above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Additional fillers suitable for use in the composition include aluminum oxide, silicates from the group consisting of olivine group; garnet group; aluminosilicates; ring silicates; chain silicates; and sheet silicates. In certain embodiments, some fillers can be utilized to tune a thixotropic property of the composition.

In various embodiments, the composition further comprises an adhesion-imparting agent (e.g. an adhesion promotor). The adhesion-imparting agent can improve adhesion of the cross-linked silicone acrylate polymer formed from the composition, e.g. to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom. The organosilicon compound of the adhesion-imparting agent generally comprises a silicon-bonded alkenyl group or silicon-bonded hydrogen atom. Moreover, due to the ability to impart good adhesion with respect to various types of base materials, the organosilicon compound of the adhesion-imparting agent generally comprises at least one epoxy group-containing monovalent organic group in a molecule. These type of organosilicon compounds are exemplified by organosilane compounds, organosiloxane oligomers and alkyl silicates, as understood by those of skill in the art. Molecular structures of the organosiloxane oligomers and/or alkyl silicate are exemplified by a linear chain structure, partially branched linear chain structure, branched chain structure, ring-shaped structure, and net-shaped structure, where the linear chain structure, branched chain structure, and net-shaped structure are typical. Specific organosilicon compounds for use in or as the adhesion-imparting agent are exemplified by silane compounds such as 3-glycidoxypropyltrimethoxysilane, 2-(3,4-epoxycyclohexyl)-ethyltrimethoxysilane, 3-methacryloxy propyltrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxy group and at least one silicon-bonded alkenyl group in the molecule; and methyl polysilicate, ethyl polysilicate, and epoxy group-containing ethyl polysilicate.

In certain embodiments, the composition comprises an accelerator and/or a plasticizer, such as benzyl alcohol, salicylic acid, and/or tris-2,4,6-dimethylaminomethyl phenol The one or more of the additives can be present as any suitable weight percent (wt. %) of the composition, such as in an amount of from 0.01 wt. % to 65 wt. %, such as from 0.05 to 35, alternatively from 0.1 to 15, alternatively from 0.5 to 5 wt. %. In these or other embodiments, one or more of the additives can be present in the composition in an amount of 0.1 wt. % or less, alternatively of 1, 2, 3, 4, 5, 6, 7, 8, 9, 10, 11, 12, 13, 14, or 15 wt. %, or more of the composition. One of skill in the art can readily determine a suitable amount of a particular additive depending, for example, on the type of additive and the desired outcome.

In certain embodiments, the composition is substantially free from, alternatively is free from, a reaction catalyst or promotor (e.g. with respect to the cross-linking reaction of components (I) and (II)), other than components (I) and (II). In these or other embodiments, the composition is substantially free from, alternatively is free from, a carrier vehicle, i.e., other than components (I) and (II) (e.g. when one or both of the components (I) and (II) is capable of acting as a carrier vehicle).

A method of preparing the composition (the "preparation method") is also provided. In general, the preparation method comprises combining together components (I) and (II), optionally with any additional components being utilized (collectively, the "components"). The components may be combined using any techniques and/or procedures for preparing curable compositions, which are generally known in the art. The components may be combined in any order, simultaneously, or any combinations thereof (e.g. in various multi-part compositions which are eventually combined with one another). Likewise, the composition may be prepared in batch, semi-batch, semi-continuous, or continuous processes, unless otherwise noted herein. Typically, once combined, the components of the composition are homogenized, e.g. via mixing, which may be performed by any of the various techniques known in the art using any equipment suitable for the mixing. Examples of suitable mixing techniques generally include ultrasonication, dispersion mixing, planetary mixing, three roll milling, etc. Examples of mixing equipment include agitated batch kettles for relatively high-flowability (low dynamic viscosity) compositions, ribbon blenders, solution blenders, co-kneaders, twin-rotor mixers, Banbury-type mixers, mills, extruders, etc., which may be batch-type or continuous compounding-type equipment, and utilized alone or in combination with one or more mixers of the same or different type.

The components of the composition (e.g. component (I), component (II), etc.) may be prepared or otherwise obtained. In certain embodiments, the preparation method comprises preparing the silicone-acrylate polymer (I), e.g. according to the polymerization method above. In such embodiments, the preparation method thus comprises reacting the acryloxy-functional organosilicon component (A), the epoxy-functional acrylate component (B), and optionally the acrylate component (C), to give the silicone-acrylate polymer (I), and combining the silicone-acrylate polymer (I) and the aminosiloxane (II) to give the composition.

A method of preparing an aminosiloxane-silicone-acrylate copolymer from the composition (i.e., the "copolymerization method") is also provided. The copolymerization method generally comprises providing the composition and reacting the silicone-acrylate polymer (I) and the aminosiloxane (II) therein, optionally via heating the composition, to give the aminosiloxane-silicone-acrylate copolymer. More particularly, as described above, the silicone-acrylate polymer (I) and the aminosiloxane (II) are reactive with each other via crosslinking reaction between the amine functional groups of the aminosiloxane (II) and the epoxide groups of the silicone-acrylate polymer (I). Such a reaction prepares the aminosiloxane-silicone-acrylate copolymer, i.e., an aminosiloxane cross-linked silicone-acrylate copolymer, which may be referred to more simply as the "copolymer" herein and is described further below.

In certain embodiments, the copolymerization method is performed with the composition being substantially free from, alternatively free from, components other than the silicone-acrylate polymer (I) and the aminosiloxane (II). For example, in certain embodiments, the reaction of components (I) and (II) is carried out in the absence of any carrier vehicle or solvent. In such embodiments, no carrier vehicle or solvent may be combined discretely with the silicone-acrylate polymer (I) and/or the aminosiloxane (II), or with any other components present in the reaction mixture (e.g. one or more of the additives of the composition, as described above, if utilized). In these or other embodiments, none of the reaction components (i.e., the silicone-acrylate polymer (I) and the aminosiloxane (II)) are disposed in any carrier vehicle or solvent prior to and/or after being combined to prepare the composition, such that no carrier vehicle or solvent is present in the reaction mixture during the cross-linking (i.e., the composition is free from, alternatively substantially free from, solvents). In certain embodiments, the copolymerization method comprises actively excluding carrier vehicles from the reaction, such as via drying or purifying one or more components of the composition, or the composition itself, before use. The above notwithstanding, in certain embodiments, one or both of components (I) and (II) may be a carrier, e.g. when utilized as a fluid in an amount sufficient to carry, dissolve, or disperse any other component(s) of the composition. In some embodiments, the silicone-acrylate polymer (I) is utilized as a carrier. In specific embodiments, the aminosiloxane (II) is utilized as a carrier (i.e., in the composition utilized in the copolymerization method).

In some embodiments, the copolymerization method is performed (i.e., components (I) and (II) are reacted) at an elevated temperature. The elevated temperature will be selected and controlled depending on the particular silicone-acrylate polymer (I) and/or the aminosiloxane (II) to be reacted, a reaction vessel selected (e.g. whether open to ambient pressure, sealed, under reduced pressure, etc.), etc. Accordingly, the elevated temperature will be readily selected by one of skill in the art in view of the reaction conditions and parameters selected and the description herein. The elevated temperature is typically from greater than 25° C. (ambient temperature) to 250° C., such as from 25 to 225, alternatively from 40 to 200, alternatively from 60 to 200, alternatively from 80 to 200, alternatively from 100 to 200, alternatively from 120 to 200, alternatively from 125 to 200, alternatively from 130 to 200, alternatively from 130 to 175. ° C. In certain embodiments, the elevated temperature is selected and/or controlled based on the boiling point of any one solvent or volatile diluent, such as when utilizing refluxing conditions.

It is to be appreciated that the elevated temperature may differ from the ranges set forth above, e.g. when both elevated temperature and a reduced or elevated pressure are utilized, and other or alternative reaction conditions may be employed. For example, in certain embodiments, a reduced or elevated pressure is utilized in order to maintain reaction progression while utilizing a lower reaction temperature, which may lead to a decrease in the formation of undesirable byproducts (e.g. degradation, and/or decomposition byproducts). Likewise, it is also to be appreciated that reaction parameters may be modified during the reaction of the reaction components. For example, temperature, pressure, and other parameters may be independently selected or modified during the reaction. Any of these parameters may independently be an ambient parameter (e.g. room temperature and/or atmospheric pressure) and/or a non-ambient parameter (e.g. reduced or elevated temperature and/or reduced or elevated pressure). Any parameter, may also be dynamically modified, modified in real time, i.e., during the method, or may be static (e.g. for the duration of the reaction, or for any portion thereof.). Oxygen may optionally be removed from the reaction during the copolymerization method, e.g. by bubbling nitrogen or another inert gas into the vessel.

As introduced above, the cross-linking reaction of the silicone-acrylate polymer (I) and the aminosiloxane (II) prepares the aminosiloxane-silicone-acrylate copolymer, i.e., the "copolymer." In particular, the amine functional groups of the aminosiloxane (II) are configured to be reactive with the epoxide groups of the silicone-acrylate polymer (I) to prepare a cured/networked product therefrom. As such, during the copolymerization method, the silicone-acrylate polymer (I) and the aminosiloxane (II) react with each other via a cross-linking reaction based on ring-opening amine-epoxide reactions between the amine functional groups of component (II) and the epoxide groups in $X^1$ of component (I), thus preparing the copolymer as an aminosiloxane cross-linked silicone-acrylate copolymer. Accordingly, one of skill in the art will readily appreciate that the structure, molecular composition, and physical properties of the copolymer will be influenced by the particular components utilized in the copolymerization method (i.e., the silicone-acrylate polymer (I) selected, the aminosiloxane (II) selected, and any optional components utilized).

A cured product formed from the composition is also provided. In general, the cured product is formed by curing the composition, i.e., by cross-linking the silicone-acrylate polymer (I) with the aminosiloxane (II), in the presence of any optional components utilized in the composition. The cross-linking reaction may thus be characterized as a "curing" reaction, with the resulting composition (i.e., including the copolymer and any optional components, such as a filler, adhesion promotor, etc.) being characterized as the cured product. However, other curing methods and/or techniques may also be utilized, e.g. in conjunction with the aforementioned cross-linking, such as when the composition comprises other cure-compatible functionality. As such, particular method(s) of curing the composition are not particularly limited, and may include any method and/or technique of curing known by those of skill in the art compatible with the components of the composition described above. Examples of curing methods and/or technique include photocuring, moisture curing, cross-linking, etc.

In certain embodiments, curing the composition comprises heating the composition at, or to, an elevated temperature, e.g. to promote cross-linking of the silicone-acrylate polymer (I) with the aminosiloxane (II). The elevated temperature, which may alternatively be referred to as the curing temperature of the composition, will be selected and controlled depending on the particular silicone-acrylate polymer (I) and/or the aminosiloxane (II) to be reacted, the conditions under which the curing is performed (e.g. whether under ambient or controlled conditions, whether the composition is disposed on a substrate during curing, etc.). Accordingly, the curing temperature will be selected by one of skill in the art in view of the reaction conditions and parameters selected and the description herein, and may be the as or different from the elevated temperature of the copolymerization method. For example, the curing temperature is typically from 23 to 200° C., such as from greater than ambient temperature (e.g. greater than 25° C.) to 200° C., alternatively greater than 25 to 180, alternatively greater than 25 to 165, alternatively greater than 25 to 150, alternatively from 30 to 150, alternatively from 50 to 150, alternatively from 70 to 150, alternatively from 85 to 150, alternatively from 100 to 150, alternatively from 120 to 150° C. In certain embodiments, the curing temperature is selected and/or controlled based on the boiling point of any one solvent or volatile diluent, such as when such a solvent/diluent is present in the composition and curing is performed under refluxing conditions.

In general, curing speed of the composition (i.e., of at least components (I) and (II)) increases: i) as the curing temperature increases, ii) as relative epoxy and/or amine group content increases (i.e., in the silicone-acrylate polymer (I) and/or the aminosiloxane (II), respectively); and iii) as a relatively/comparatively less sterically hindered silicone-acrylate polymer (I) and/or aminosiloxane (II) is utilized. In exemplary embodiments, the cure time (i.e., cross-linking time by visual inspection and/or via rheometric monitoring) of the composition is from <5 minutes to >10 days, depending on the curing temperature and particular selections for the silicone-acrylate polymer (I) and the aminosiloxane (II).

As such, as will be understood by those of skill in the art, the copolymer itself may be characterized as the cured product of the composition (e.g. when the composition consists essentially of, alternatively consists of components (I) and (II)), or, alternatively, as a component of such a cured product (e.g. when prepared in the presence of components other than (I) and (II)). In the latter case, the cured product may be referred to as a cured composite (i.e., the "composite"). One of skill in the art will readily appreciate that the structure, molecular composition, and physical properties of the copolymer, and thus the cured product and/or composite comprising the same, will be influenced by the particular components of the composition (i.e., the silicone-acrylate polymer (I) selected, the aminosiloxane (II) selected, and any optional components utilized). Moreover, when the cured product and/or the composite may be further defined, e.g. as a conductive composite, adhesive, etc., depending on the formulation of the composition and the curing conditions utilized to prepare the cured product and/or composite.

For example, in certain embodiments, the composition may be characterized as an adhesive composition, and the cured product as an adhesive. The aspects of the various embodiments described above may provide the adhesive with improved performance characteristics. For example, in certain embodiments, the adhesive composition is free from any adhesion promotors (i.e., other than components (I) and (II), and the adhesive prepared therefrom exhibits an adhesion strength of at least 0.4 MPa. For example, in some such embodiments, the adhesive exhibits an adhesion strength of at least 0.5 MPa, such as least 0.6, alternatively at least 0.7, alternatively at least 0.8, alternatively at least 0.9, alternatively at least 1 MPa. In particular embodiments, the adhesive exhibits an adhesion strength of from 0.7 to 4 MPa. However, the adhesive may comprise any maximum adhesion strength, such as a maximum adhesion of 7 MPa, alternatively a maximum adhesion of 6 MPa, alternatively a maximum adhesion of 5 MPa. For example, in certain embodiments, the adhesive comprises an adhesion promoter, and may comprise an adhesion strength in the upper portions of the ranges above, or even exceeding such ranges.

The adhesion strength of the adhesive may be measured according to the Adhesive Strength Test Method set forth and described below. However, it is to be appreciated that the adhesion strength of the adhesive may vary, e.g. between different substrates, cure conditions, etc. As such, the adhesion strength values and ranges above may apply to the properties of the adhesive with respect to but one particular application (e.g. when utilized with respect to a specific metal substrate (e.g. Al, Ni—Cu, Alclad, etc.), or, alternatively, to any number of applications.

It is to be appreciated that the properties described above with respect to the adhesive may apply equally to other forms of the composition and cured product thereof.

The composition may be utilized to prepare a composite article, i.e., an article comprising the cured product disposed on a substrate. For example, the composite article may be formed by disposing the composition on the substrate (e.g. as an already-prepared curable composition, or in a stepwise fashion to prepare the curable composition in-situ on the substrate), and curing the composition to give the cured product on the substrate, thereby preparing the composite article. In this fashion, the composition is typically used to prepare a layer on the substrate, such as an adhesive layer, conductive layer, etc.

The composition can be disposed or otherwise applied onto the substrate in any amount. For example, the composition may be applied in an amount sufficient to achieve a nominal dry film thickness (DFT) of at least 1 mil, alternatively at least 2 mils, alternatively at least 2.5 mils, alternatively at least 3 mils, where 1 mil equals ¹⁄₁₀₀₀ of an inch.

The composition can be cured on the substrate at room temperature or at an elevated temperature (e.g. such the elevated temperature described above with respect to the copolymerization method, the curing temperature, etc.), such as in a forced air oven or with other types of heating sources. For example, the substrate may comprise an integrated heat source (e.g. a hot plate). The cured product may be physically and/or chemically bonded to the substrate, or instead may be separable from the substrate, depending on the particular substrate and components of the composition utilized.

The substrate of the composite article is not limited, and may be any substrate on which the composition may be disposed. Examples of substrates generally include plastics (e.g. thermoplastics and/or thermosets), silicones, woods, metals (e.g. aluminum, steel, galvanized sheeting, tin-plated steel, etc.), concretes, glass, ceramics, composites, celluloses (e.g. paper, such as Kraft paper, polyethylene coated Kraft paper (i.e., PEK coated paper), thermal paper, regular papers, etc.), cardboards, paperboards, primed or painted surfaces, and the like, as well as combinations thereof.

Specific examples of suitable plastic substrates generally include thermoplastic and/or thermosetting resins, such as polyamides (PA); polyesters such as polyethylene terephthalates (PET), polybutylene terephthalates (PBT), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof. However, it is to be appreciated that substrates other than those listed above may also be utilized to prepare the composite article, e.g. via coating and curing the composition on such other substrates.

Additionally, the substrate may have a continuous or non-continuous shape, size, dimension, surface roughness, and/or other such characteristics. In some embodiments, the substrate may have a softening point temperature at or below the elevated temperature, such that curing the composition at the elevated temperature increase the mechanical bonding of the cured product to the substrate.

The substrate is exemplified by, for example, a component of a functional device. The particular type and nature of the functional device is not particular limited, and may be any kind of optical, electrical, and/or electronic device, such that the component may comprise, or be utilized in devices containing, a waveguide, electrical circuit, electrode, etc. Particular examples of functional devices include: optical devices; photoelectric devices; photo mechanic devices; photomagnetic devices; electrical and/or electronic devices; electro-optical devices; mechanical devices; electromechanical devices including a micro-electromechanical system; magnetic devices; photo-electro-magnetic devices; mechanomagnetic devices; thermal devices; thermo-mechanical devices; thermo-optical devices; thermo-electric and/or thermo-electronic devices; thermo-magnetic devices; and the like, as well as derivatives, modifications, and combinations thereof. As will be appreciated by those of skill in the art, the cured product and/or composite article may also be a component of a functional device, such as any of those described above.

As will be understood in view of the description above, the composition, copolymer, cured product, composite article, and other related compositions and products, as well as the methods of preparing the same, utilize as a starting material or precursor the epoxide-functional silicone-acrylate polymer (i.e., component (I), the "silicone-acrylate polymer") described above. The silicone-acrylate polymer can thus be utilized in diverse end-use applications, including as a component in a functional composition, a precursor for preparing copolymers or other materials, etc. The silicone-acrylate polymer may be utilized in particular to enhance properties such as conductivity, toughness, adhesion, and curing in silicone elastomers and other compositions prepared therefrom, with improved compositions and materials prepared therefrom suitable for use in varied applications such as in or as composite materials, moldable optics, adhesives, etc. As such, it is to be appreciated that the silicone-acrylate polymer, and the polymerization method described above for preparing the same, may be utilized in applications other than the curable composition. Accordingly, the silicone-acrylate polymer, which may be used as component (I) of the composition above, or otherwise, is provided and described below with respect to certain aspects of this disclosure.

In a first aspect (i.e., "Aspect 1"), the epoxide-functional silicone-acrylate polymer has the following general unit formula:

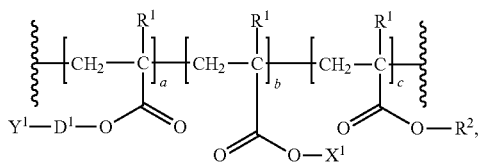

wherein: each $R^1$ is independently selected from H and $CH_3$; each $R^2$ is an independently selected substituted or unsubstituted hydrocarbyl group; each $D^1$ is a divalent linking group; each $Y^1$ is an independently selected siloxane moiety; each $X^1$ is an independently selected epoxide-functional moiety; subscript $a \geq 1$; subscript $b \geq 1$; subscript $c \geq 0$; and units indicated by subscripts a, b, and c may be in any order in the silicone-acrylate polymer.

In a second aspect (i.e., "Aspect 2"), further describing the epoxide-functional silicone-acrylate polymer of Aspect 1, where at least one siloxane moiety $Y^1$ comprises a siloxane group having general formula $-Si(R^3)_3$, where each $R^3$ is independently selected from $R^4$ and $-OSi(R^5)_3$, with the proviso that at least one $R^3$ is $-OSi(R^5)_3$; where each $R^5$ is independently selected from $R^4$, $-OSi(R^6)_3$, and $-[-D^2-SiR^4{}_2]_m OSiR^4{}_3$; where each $R^6$ is independently selected from $R^4$, $-OSi(R^7)_3$, and $-[-D^2-SiR^4{}_2]_m O-SiR^4{}_3$; where each $R^7$ is independently selected from $R^4$ and $-[-D^2-SiR^4{}_2]_m OSiR^4{}_3$; where $0 \leq m \leq 100$; where each $D^2$ is a divalent linking group; and where each $R^4$ is independently a substituted or unsubstituted hydrocarbyl group.

In a third aspect (i.e., "Aspect 3"), further describing the epoxide-functional silicone-acrylate polymer of Aspect 2, wherein: (i) each $R^3$ is $-OSi(R^5)_3$; (ii) each $R^4$ is methyl; (iii) at least one $R^5$ is $-OSi(R^6)_3$ or $-[-D^2-SiR^4{}_2]_m OSiR^4{}_3$; (iv) each $D^2$ is independently O or ethylene; or (v) any combination of (i)-(iv).

In a fourth aspect (i.e., "Aspect 4"), further describing the epoxide-functional silicone-acrylate polymer of any preceding aspect (i.e., any one of Aspects 1-3), wherein at least one siloxane moiety $Y^1$ comprises a siloxane group having the following general formula:

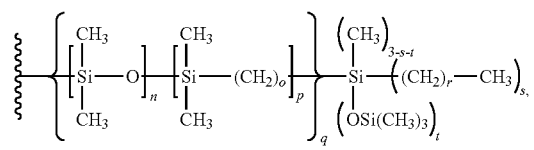

where $0 \leq n \leq 100$, subscript o is from 2 to 6, subscript p is 0 or 1, subscript q is 0 or 1, subscript r is from 0 to 9, subscript s is 0 or 1, and subscript t is 0 or 2, with the provisos that subscript t is 0 when subscript s is 1, and subscript t is 2 when subscript s is 0.

In a fifth aspect (i.e., "Aspect 5"), further describing the epoxide-functional silicone-acrylate polymer of any preceding aspect (i.e., any one of Aspects 1-4), wherein each siloxane moiety $Y^1$ is independently a siloxane group having one of the following formulas (i)-(vii):

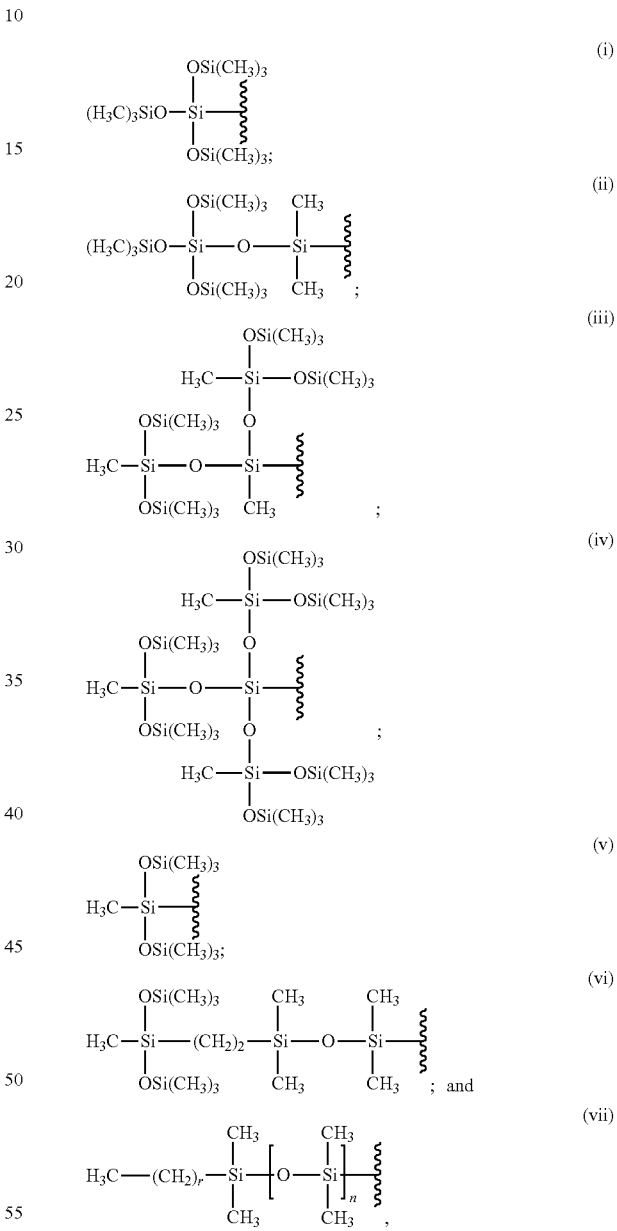

where $1 \leq n \leq 100$ and subscript r is from 3 to 9.

In a sixth aspect (i.e., "Aspect 6"), further describing the epoxide-functional silicone-acrylate polymer of any preceding aspect (i.e., any one of Aspects 1-5), wherein each divalent linking group $D^1$ comprises: (i) an independently selected linear alkylene group having from 2 to 6 carbon atoms; (ii) a tertiary amino group; or (iii) both (i) and (ii).

In a seventh aspect (i.e., "Aspect 7"), further describing the epoxide-functional silicone-acrylate polymer of any preceding aspect (i.e., any one of Aspects 1-6), wherein: (i) $R^1$ is $CH_3$ in each moiety indicated by subscript a; (ii) $R^1$ is $CH_3$ in each moiety indicated by subscript b; (iii) $R^1$ is H in each moiety indicated by subscript c; (iv) each $R^2$ is butyl; (v) $X^1$ is an epoxypropyl group of formula

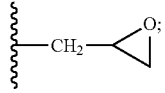

or (vi) any combination of (i)-(v).

In an eight aspect (i.e., "Aspect 8"), further describing the epoxide-functional silicone-acrylate polymer of any preceding aspect (i.e., any one of Aspects 1-7), wherein when subscript c>0, the epoxide-functional silicone-acrylate polymer comprises at least one siloxane moiety $Y^1$ free from polysiloxane moieties having 10 or more repeating siloxane units.

It is to be appreciated that the term "polymer" is utilized herein in the conventional sense to generally denote a compound comprising repeating units (i.e., monomeric units), which may be prepared by reacting (i.e., polymerizing) monomers, whether of the same or a different type than one another. The term polymer thus encompasses the terms "homopolymer", which term denotes polymers comprising but one type of monomeric unit, "interpolymer," which term denotes polymers comprising two different types of monomeric units, as well as "terpolymer", which term denotes polymers comprising three different types of monomeric units. It is also to be appreciated that the term "copolymer" is also utilized herein in the conventional sense to denote a polymer comprising at least two different types of monomeric units, such that the term copolymer encompasses interpolymers, terpolymers, etc. As such, the term polymer also encompasses copolymers of all forms, including random, block, co-block, etc.

It is also to be understood that, although a polymer is often referred to as comprising or being "made of" or one or more specified monomerics, "based on," "formed from," or "derived from" a specified monomer or monomer type, "containing" a specified monomer content or proportion of a specified monomer, in this context the term "monomer" is understood to be referring to the monomeric unit in the polymer itself, i.e., the polymerized remnant of the specified monomer utilized in preparing the polymer, or a unit that could be so prepared, and not to the unpolymerized monomer species. As such, as used herein, polymers are generally referred to has having monomeric units in the polymerized form, which each correspond to an unpolymerized monomer (i.e., even if such monomer was not used to prepare the particular monomeric unit denoted, such as when an oligomer is utilized to prepare the specifies polymer.).

In any of the polymers described above, it is also to be understood that that trace amounts of impurities can be incorporated into or otherwise present in the polymer structure without changing the characterization of the polymer itself, which will generally be classified based on an average monomeric unit formula (i.e., excluding trace amounts of impurities from, for example, catalyst residues, initiators, terminators, etc., which may be incorporated into and/or within the polymer).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The following examples, illustrating embodiments of this disclosure, are intended to illustrate and not to limit the invention. Unless otherwise noted, all reactions are carried out under air, and all solvents, substrates, and reagents are purchased or otherwise obtained from various commercial suppliers and utilized as received.

An exemplary method of determining the adhesion of a sample using a lap shear test, with measurements of tensile strength performed on a Tensile Tester (e.g. Instron, Model 5566), is provided as the following Adhesion Strength Test Method:

Lap shear panels (bare aluminum, Ni—Cu, Alclad) of dimensions 0.040"×1"×3" are wiped clear with a cleaning wipe (Kimwipe) and isopropyl alcohol, placed in an oven at 150° C. for 10 minutes to ensure complete solvent evaporation, and then allowed to cool to room temperature. The panels are grouped into five pairs, and a first panel in each pair is marked 1" from an end of the panel. An aliquot of uncured composite material (sample; ~2 g) is applied to the first panels in the 1" area between the marking and the end of the panel from which the marking was measured. A portion of glass beads (Potter's Industries Inc.; 0.0098" max diameter; ~10 mg) is applied on top of the composite to establish a bond line, and then the second panels of each pair is gently pressed on top of the portion of the corresponding first panel to form an assembly, which is held together and in place with binder clips. The assemblies are placed into an oven at 150° C. for 4 hours to cure the composite material, and then cooled to room temperature overnight. The assemblies are then analyzed on the tensile tester using a 10 KN load cell, 60 psi clamp pressure, and a pull rate of 2 in/min, with tensile strength measurements recorded for each of the 5 prepared lap shears averaged to give an adhesion strength value (MPa).

The following equipment and characterization procedures/parameters are used to evaluate various physical properties of the compounds and compositions prepared in the examples below.

Nuclear Magnetic Resonance Spectroscopy (NMR)

Nuclear magnetic resonance (NMR) analysis is conducted on a Varian Unity INOVA 400 (400 MHz) spectrometer, using a silicon-free 10 mm tube and appropriate solvent (e.g. $CDCl_3$). Chemical shifts for spectra are referenced to internal protio solvent resonance ($^1$H: $CDCl_3$; $^{29}$Si: tetramethylsilane).

Gel Permeation Chromatography (GPs)

Gel permeation chromatography (GPC) analysis is conducted on an Agilent 1260 Infinity II chromatograph with an Agilent refractive index detector using GPC/SEC software and equipped with PLgel 5 μm Mixed-C columns (300×7.5 mm; Polymer Laboratories) preceded by a PLgel 5 μm guard column. Analysis is performed using tetrahydrofuran (THF) mobile phase at a nominal flow rate of 1.0 mL/min at 35° C., with samples dissolved in THF (5 mg/mL), and optionally filtered through a 0.2 μm PTFE syringe filter, prior to injection. Calibration is performed using narrow polystyrene (PS) standards covering the range of 580 to 2,300,000 g/mol fit to a 3rd order polynomial curve.

Dynamic Viscosity (DV)

Viscosity measurements are performed on an Anton-Paar Physica MCR 301 rheometer fitted with a 25 mm stainless steel cone-in-plate fixture (CP 25, 1.988" cone angle with 104 μM truncation) at an operating temperature of 25° C. using the Expert flow curve steady state control method available in the accompanying software package (Rheoplus 32 V3.40). A shear rate sweep from 0.1 to 500 s$^{-1}$ is performed and values at a frequency of 10 rad/sec are reported in centipoise (cP).

The various components utilized in the Examples are set forth in Table 1 below.

TABLE 1

| Components/Compounds Utilized | |
|---|---|
| Component | Description |
| AFOSC (A1) | [bis(trimethylsiloxy)methylsiloxy]-propyl methacrylate, i.e., a (meth)acryloxy-functional organosilicon compound (monomer) having formula: 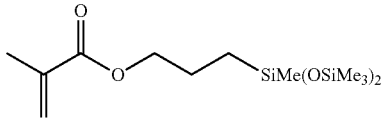 |
| AFOSC (A2) | A (meth)acryloxy-functional organosilicon compound (monomer) having formula: 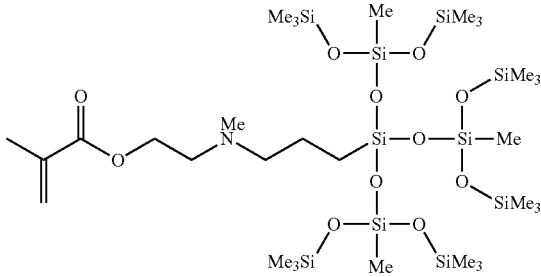 [SMILES: C=C(C)C(=O)OCCN(C)CCC[Si](O[Si](C)(O[Si](C)(C)C)O[Si](C)(C)C)(O[Si](C)(O[Si](C)(C)C)O[Si](C)(C)C)O[Si](C)(O[Si](C)(C)C)O[Si](C)(C)C] |
| AFOSC (A3) | Mono-(meth)acrylate-terminated polydimethylsiloxane having a MW = 800-1000, i.e., a (meth)acryloxy-functional organosilicon compound (monomer) having general formula: 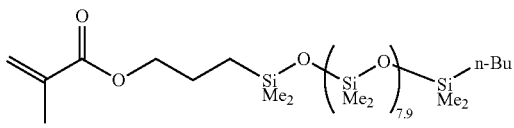 |
| AFOSC (A4) | A (meth)acryloxy-functional organosilicon compound (monomer) having general formula: 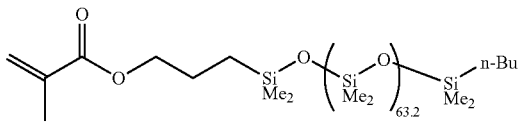 |
| AFOSC (A5) | A (meth)acryloxy-functional organosilicon compound (monomer) having general formula: 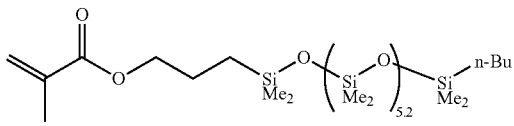 |
| AFOSC (A6) | A (meth)acryloxy-functional organosilicon compound (monomer) having formula: 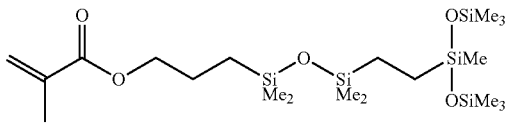 |

TABLE 1-continued

Components/Compounds Utilized

| Component | Description |
| --- | --- |
| AFOSC (A7) | A (meth)acryloxy-functional organosilicon compound (monomer) having formula: |

[Structure: methacryloxypropyl-SiMe$_2$-O-SiMe$_2$-hexyl]

| | |
| --- | --- |
| EFAC (B1) | Glycidyl (meth)acrylate, i.e., an epoxide-functional (meth)acrylate compound (monomer) having formula: |

[Structure: glycidyl methacrylate]

| | |
| --- | --- |
| Acrylate Monomer (C1) | n-butyl acrylate, i.e., an epoxide-functional acrylate compound (monomer) having formula: |

[Structure: CH$_2$=CH-C(=O)-O(n-Bu)]

| Component | Description |
| --- | --- |
| Initiator (D1) | Benzoyl peroxide (BPO) |
| Solvent (E1) | Toluene |
| Chain-Transfer Agent (F1) | n-dodecanethiol |
| Aminosiloxane (AS-1) | An aminosiloxane having formula:<br>H$_2$N—nPrMD$_9$M—nPrNH$_2$ |
| Aminosiloxane (AS-2) | An aminosiloxane having formula:<br>H$_2$N—nPrMD$_{37}$M—nPrNH$_2$ |
| Aminosiloxane (AS-3) | An aminosiloxane having formula:<br>H$_2$N—nPrMD$_{64}$M—nPrNH$_2$ |
| Aminosiloxane (AS-4) | An aminosiloxane having formula:<br>M$_{0.29}$D$^{NH2}_{0.24}$T$^{Ph}_{0.24}$D$^{Ph}_{0.23}$ |
| Aminosiloxane (AS-5) | An aminosiloxane having formula: |

[Structure: Me$_3$Si—O—(SiMe$_2$—O)$_{65.94}$—(Si(Me)(CH$_2$CH$_2$CH$_2$NH$_2$)—O)$_{1.69}$—SiMe$_3$]

| | |
| --- | --- |
| Aminosiloxane (AS-6) | An aminosiloxane having formula: |

[Structure: Me$_3$Si—O—(SiMe$_2$—O)$_{98.38}$—(Si(Me)(CH$_2$CH$_2$CH$_2$NH$_2$)—O)$_{4.64}$—SiMe$_3$]

TABLE 1-continued

Components/Compounds Utilized

| Component | Description |
|---|---|
| Aminosiloxane (AS-7) | An aminosiloxane having formula: |

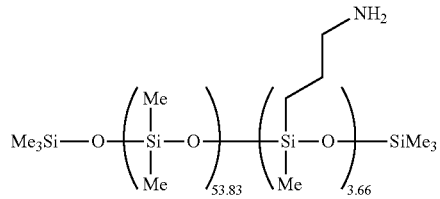

General Procedure 1: Preparation of Epoxide-Functional Silicone-Acrylate Polymers The procedure utilized in Example 12 set forth below, in which epoxy-functional silicone-acrylate polymer SA-12 is prepared, is provided below as a general procedure for preparing the epoxy-functional silicone-acrylate polymers of the Examples.

Toluene (10 g) is added to an oven-dried 500 mL 4-neck round bottomed flask, equipped with stir shaft, condenser, thermocouple port, addition ports, and a heating mantle. A mixture of AFOSC (A1) (45 g), AFOSC (A3) (47 g), EFAC (B1) (11 g), and CTA (F1) (5 g) (collectively, the "monomer blend") is prepared and split into two plastic syringes with Luer Lock connectors, which are equipped with a feed line into the flask and connected to a syringe pump. A mixture of Initiator (D1) (3.15 g) and toluene (30 g) (the "initiator blend") is added to another plastic syringe with a Luer Lock connector, which is equipped with a feed line into the flask and connected to a syringe pump. The flask is heated to reach a target temperature (110° C.) with stirring, at which time a feed of the monomer blend is initiated (rate: 2 g/min; duration: 54 min). After a 5 min delay, a feed of the initiator blend is initiated (duration: 150 min), and the reaction monitored via $^1$H NMR. After completion of both feeds, the reaction mixture is maintained at the target temperature (110° C.) with stirring for 1 h, and then allowed to cool to room temperature (~23° C.) to give a reaction product comprising an epoxide-functional silicone-acrylate polymer. The reaction product is stripped of solvent in vacuo to isolate the epoxide-functional silicone-acrylate polymer, which is then characterized according to the procedures above (yield: 88%; viscosity=750 cP). GPC analysis against polystyrene standards provides the average molecular weight values set forth in Table 2 below:

TABLE 2

Average Molecular Weights (GPC) for Silicone-Acrylate Polymer of Example 12

| SA Polymer | Peak RT (min) | Mp | Mn | Mw | Mz | PD |
|---|---|---|---|---|---|---|
| SA-12 | 7.1640 | 12087 | 8156 | 13086 | 20029 | 1.6045 |

Examples 1-15 and Comparative Examples 1-3: Silicone-Acrylate Polymers

Silicone-acrylate polymers are prepared using various acryloxy-functional organosilicon compounds (AFOSC), epoxy-functional acrylate compounds (EFAC), and acrylate monomers (AM) to give Examples 1-15. Epoxy-functional acrylate polymers are prepared using various epoxy-functional acrylate compounds (EFAC) and acrylate monomers (AM) to give Comparative Examples 1-3. In particular, silicone-acrylate polymers (SA-1-SA-15, from Examples 1-15, respectively) and comparative epoxy-functional acrylate polymers (EA-1-EA3, from Comparative Examples 1-3, respectively) are prepared according to the procedure set forth in General Procedure 1, utilizing the particular components and parameters set forth in Tables 3-5 below. In each procedure, Initiator (D1) and CTA (F1) are utilized as the initiator (D) and chain-transfer agent (F), respectively.

TABLE 3

Components and Parameters of Examples 1-8

| | Example: | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| AFOSC (A): | A1 | A1 | A1 | A1 | A1 | A1 | A5 | A6 |
| Amount (A) (wt. %): | 85 | 91 | 96 | 71 | 79 | 71 | 83 | 78 |
| EFAC (B): | B1 | B1 | B1 | B1 | B1 | B1 | B1 | B1 |
| Amount (B) (wt. %): | 15 | 9 | 4 | 29 | 21 | 29 | 17 | 22 |
| Mol Ratio (A):(B): | 7:3 | 8:2 | 9:1 | 5:5 | 6:4 | 5:5 | 5:5 | 5:5 |
| Amount (D) (mol %): | 1.5 | 1.5 | 1.5 | 6 | 1.5 | 1.5 | 6 | 6 |
| Amount (F) (mol %): | 7 | 7 | 7 | 6 | 7 | 7 | 10 | 10 |
| Temperature (° C.): | 100 | 100 | 100 | 110 | 100 | 100 | 110 | 110 |
| Yield (%): | 91 | 91 | 93 | 94 | 94 | 94 | 94 | 93 |
| Purity (%): | 99 | 99 | 99 | 99 | 99 | 99 | >99 | >99 |
| SA Polymer: | SA-1 | SA-2 | SA-3 | SA-4 | SA-5 | SA-6 | SA-7 | SA-8 |

TABLE 4

Components and Parameters of Examples 9-14

| | Example: | | | | | |
|---|---|---|---|---|---|---|
| | Ex. 9 | Ex. 10 | Ex. 11 | Ex. 12 | Ex. 13 | Ex. 14 |
| AFOSC (Ai): | A1 | A1 | A1 | A1 | A1 | A1 |
| Amount (Ai) (wt. %): | 61 | 55 | 37 | 44 | 37 | 29 |
| AFOSC (Aii): | A7 | A6 | A2 | A3 | A3 | A3 |
| Amount (Aii) (wt. %): | 24 | 32 | 49 | 45 | 48 | 51 |
| EFAC (B): | B1 | B1 | B1 | B1 | B1 | B1 |
| Amount (B) (wt. %): | 15 | 11 | 15 | 11 | 15 | 20 |

TABLE 4-continued

Components and Parameters of Examples 9-14

| | Example: | | | | | |
|---|---|---|---|---|---|---|
| | Ex. 9 | Ex. 10 | Ex. 11 | Ex. 12 | Ex. 13 | Ex. 14 |
| Mol Ratio (Ai): (Aii):(B): | 5:2:3 | 5:2:3 | 4:2:4 | 5:2:3 | 4:2:4 | 3:2:5 |
| Amount (D) (mol %): | 6 | 4 | 8 | 6 | 6 | 6 |
| Amount (F) (mol %): | 7 | 10 | 10 | 10 | 10 | 10 |
| Temperature (° C.): | 110 | 110 | 110 | 110 | 110 | 110 |
| Yield (%): | 95 | 91 | 88 | 90 | 94 | 96 |
| Purity (%): | >99 | 99 | 99 | 99 | >99 | >99 |
| SA Polymer: | SA-9 | SA-10 | SA-11 | SA-12 | SA-13 | SA-14 |

TABLE 5

Components and Parameters of Example 15 and Comparative Examples 1-3

| | Example: | | | |
|---|---|---|---|---|
| | Ex. 15 | Comp. Ex. 1 | Comp. Ex. 2 | Comp. Ex. 3 |
| AFOSC (A): | A4 | N/A | N/A | N/A |
| Amount (A) (wt. %): | 94 | 0 | 0 | 0 |
| EFAC (B): | B1 | B1 | B1 | B1 |
| Amount (B) (wt. %): | 4 | 10 | 10 | 30 |
| AM (C): | C1 | C1 | C1 | C1 |
| Amount (C) (wt. %): | 3 | 90 | 90 | 70 |
| Mol Ratio (A):(B):(C): | 3:4:3 | 0:1:10 | 0:1:10 | 0:3:7.8 |
| Amount (D) (mol %): | 6 | 1.1 | 1.5 | 1.5 |
| Amount (F) (mol %): | 10 | 1.3 | 7 | 7 |
| Temperature (° C.): | 110 | 100 | 100 | 100 |
| Yield (%): | 98 | 88 | 86 | 86 |
| Purity (%): | >99 | 95 | 98 | 99 |
| SA Polymer: | SA-15 | EA-1 | EA-2 | EA-3 |

Once prepared, the silicone-acrylate polymers and epoxy-functional acrylate polymers are characterized according to the procedures above for NMR, GPC, and DV, the results of which are set forth in Table 6 below.

TABLE 6

GPC and Viscosity Data for Polymers of Examples 1-15 & Comparative Examples 1-3

| Example | SA Polymer | Mp | Mn | Mw | Mz | PD | Viscosity (cP) |
|---|---|---|---|---|---|---|---|
| Ex. 1 | SA-1 | 4946 | 3741 | 5477 | 7656 | 1.46 | 11822 |
| Ex. 2 | SA-2 | 4946 | 3617 | 5242 | 7239 | 1.45 | 5117 |
| Ex. 3 | SA-3 | 4781 | 3609 | 5236 | 7280 | 1.45 | 4350 |
| Ex. 4 | SA-4 | 5384 | 3819 | 5879 | 8523 | 1.54 | 150000 |
| Ex. 5 | SA-5 | 3520 | 2920 | 4143 | 5688 | 1.42 | 11528 |
| Ex. 6 | SA-6 | 3402 | 2847 | 4088 | 5695 | 1.44 | 36275 |
| Ex. 7 | SA-7 | 14292 | 9260 | 18849 | 34142 | 2.04 | 1105 |
| Ex. 8 | SA-8 | 10569 | 13054 | 33923 | 87086 | 2.6 | 15708 |
| Ex. 9 | SA-9 | 4946 | 3537 | 5265 | 7411 | 1.49 | 13205 |
| Ex. 10 | SA-10 | 4701 | 3438 | 4611 | 6020 | 1.34 | 2527 |
| Ex. 11 | SA-11 | 8784 | 8334 | 11641 | 17343 | 1.397 | 34563 |
| Ex. 12 | SA-12 | 12087 | 8156 | 13086 | 20029 | 1.6 | 750 |
| Ex. 13 | SA-13 | 11886 | 7405 | 12512 | 18278 | 1.69 | 1670 |
| Ex. 14 | SA-14 | 11688 | 11191 | 15302 | 22188 | 1.37 | 3352 |
| Ex. 15 | SA-15 | 44415 | 30508 | 46422 | 65397 | 1.52 | 535 |
| Comp. Ex. 1 | EA-1 | 14055 | 6904 | 14388 | 24795 | 2.08 | 101976 |
| Comp. Ex. 2 | EA-2 | 2218 | 1585 | 2644 | 4123 | 1.67 | 2051 |
| Comp. Ex. 3 | EA-3 | 2725 | 1815 | 3111 | 4825 | 1.71 | 22048 |

General Procedure 2: Preparation of Aminosiloxane-Cross-linked Acrylate Copolymers Curable Composition A vial equipped with a stir bar is charged with an epoxy-functional acrylate polymer and an aminosiloxane (AS) to prepare a curable composition having a target amine:epoxy ratio of 1:1. Compatibility is determined via visual inspection of the composition stirring at room temperature, with the mixture presenting as a clear liquid in compatible compositions. When not compatible at room temperature, the mixture may be heated to an elevated temperature, where compatibility is evidenced by the composition presenting as a transparent liquid.

Curing

Once formed, the curable composition is heated to and held at 150° C. without stirring to cross-link the starting materials and give an aminosiloxane-crosslinked silicone-acrylate copolymer. The time to cross-link is determined via visual inspection of the composition over the course of the reaction after tilting the vial (the "Tilt Test").

Example 16 Preparation of an Aminosiloxane-Crosslinked Silicone-Acrylate Copolymer An aminosiloxane-crosslinked silicone-acrylate copolymer is prepared according to General Procedure 2 above. In particular, a 1 dram vial equipped with a stir bar is charged with Silicone-Acrylate Polymers (SA-12) (1.69 g) and Aminosiloxane (AS-1) (0.59 g) to prepare a reaction mixture having an amine:epoxy ratio of 1:1 (clear liquid, showing compatibility). The reaction mixture is stirred at room temperature (23° C.), while remaining a clear liquid. The mixture is then heated to and held at 150° C. without stirring until cross-linked (13 min).

The procedure above is repeated using a curing temperature of 160° C., with the curing progress monitored by rheometer (gelation time: 14 min). The curing composition develops a modulus (G') plateau in 1.5 hrs, indicating completion of curing under the conditions utilized (G'=~$10^5$ Pa).

The procedure above is repeated using a curing temperature of 100° C., with the curing progress monitored by rheometer (gelation time: 67 min). At 300 minutes, the modulus (G") is lower than that achieved with the 160° C. (i.e., at 300 min, G"<G'), with a mild increase in G" observed, indicating further curing time is needed.

From the preceding curing conditions, a cure onset temperature of the composition, where the modulus starts increasing, is determined as ~120° C., with a G'-G" crossover at 154° C.

Examples 17-78 and Comparative Examples 4-7: Curable Compositions

Curable compositions are prepared according to General Procedure 2 using various aminosiloxanes (AS), the silicone-acrylate polymers (SA) prepared in Examples 1-15, and the comparative epoxy-functional acrylate polymers (EA) prepared in Comparative Examples 1-3 above, to give Examples 17-78 and Comparative Examples 4-7. The curable compositions are assessed for compatibility via visual inspection of the composition stirring at room temperature, with the mixture presenting as a clear liquid in compatible compositions. When not compatible at room temperature, the mixture is heated and a compatibility temperature recorded then the composition presents as a transparent liquid (visual observation).

The particular components and compatibility results of Examples 17-78 and Comparative Examples 4-7 are set forth in Tables 7 and 8 below.

TABLE 7

Components and Characteristics of Examples 17-49

| Example | Polymer | Aminosiloxane | Compatible | Compatibility Temp. (° C.) | Curable Composition |
|---|---|---|---|---|---|
| Ex. 17 | SA-1 | AS-1 | Yes | 23 | CC-1 |
| Ex. 18 | SA-1 | AS-2 | Yes | 90 | CC-2 |
| Ex. 19 | SA-1 | AS-3 | Yes | 150 | CC-3 |
| Ex. 20 | SA-1 | AS-4 | Yes | 140 | CC-4 |
| Ex. 21 | SA-3 | AS-1 | Yes | 90 | CC-5 |
| Ex. 22 | SA-3 | AS-2 | Yes | 105 | CC-6 |
| Ex. 23 | SA-3 | AS-3 | Yes | 115 | CC-7 |
| Ex. 24 | SA-3 | AS-4 | No | >120 | CC-8 |
| Ex. 25 | SA-2 | AS-1 | Yes | 50 | CC-9 |
| Ex. 26 | SA-2 | AS-2 | Yes | 50 | CC-10 |
| Ex. 27 | SA-2 | AS-3 | Yes | 105 | CC-11 |
| Ex. 28 | SA-2 | AS-4 | No | >120 | CC-12 |
| Ex. 29 | SA-9 | AS-1 | Yes | 65 | CC-13 |
| Ex. 30 | SA-9 | AS-2 | Yes | 100 | CC-14 |
| Ex. 31 | SA-9 | AS-3 | No | >120 | CC-15 |
| Ex. 32 | SA-9 | AS-4 | No | >120 | CC-16 |
| Ex. 33 | SA-5 | AS-1 | Yes | 23 | CC-17 |
| Ex. 34 | SA-5 | AS-2 | Yes | 100 | CC-18 |
| Ex. 35 | SA-5 | AS-3 | No | >120 | CC-19 |
| Ex. 36 | SA-5 | AS-4 | Yes | 110 | CC-20 |
| Ex. 37 | SA-6 | AS-1 | Yes | 23 | CC-21 |
| Ex. 38 | SA-6 | AS-2 | No | >120 | CC-22 |
| Ex. 39 | SA-6 | AS-3 | No | >120 | CC-23 |
| Ex. 40 | SA-6 | AS-4 | Yes | 70 | CC-24 |
| Ex. 41 | SA-10 | AS-1 | Yes | 23 | CC-25 |
| Ex. 42 | SA-10 | AS-2 | Yes | 23 | CC-26 |
| Ex. 43 | SA-10 | AS-3 | Yes | 90 | CC-27 |
| Ex. 44 | SA-10 | AS-4 | No | >120 | CC-28 |
| Ex. 45 | SA-11 | AS-1 | Yes | 23 | CC-29 |
| Ex. 46 | SA-11 | AS-2 | Yes | 23 | CC-30 |
| Ex. 47 | SA-11 | AS-3 | No | >120 | CC-31 |
| Ex. 48 | SA-11 | AS-4 | Yes | 100 | CC-32 |

TABLE 8

Components and Characteristics of Examples 49-78 & Comparative Examples 4-7

| Example | Polymer | Aminosiloxane | Compatible | Compatibility Temp. (° C.) | Curable Composition |
|---|---|---|---|---|---|
| Ex. 49 | SA-12 | AS-1 | Yes | 23 | CC-33 |
| Ex. 50 | SA-12 | AS-2 | Yes | 23 | CC-34 |
| Ex. 51 | SA-12 | AS-3 | Yes | 23 | CC-35 |
| Ex. 52 | SA-12 | AS-4 | No | >120 | CC-36 |
| Ex. 53 | SA-12 | AS-5 | Yes | 70 | CC-37 |
| Ex. 54 | SA-12 | AS-6 | Yes | 70 | CC-38 |
| Ex. 55 | SA-12 | AS-7 | Yes | 23 | CC-39 |
| Ex. 56 | SA-13 | AS-1 | Yes | 23 | CC-40 |
| Ex. 57 | SA-13 | AS-2 | Yes | 23 | CC-41 |
| Ex. 58 | SA-13 | AS-3 | Yes | 70 | CC-42 |
| Ex. 59 | SA-13 | AS-4 | No | >120 | CC-43 |
| Ex. 60 | SA-14 | AS-1 | Yes | 23 | CC-44 |
| Ex. 61 | SA-14 | AS-2 | Yes | 23 | CC-45 |
| Ex. 62 | SA-14 | AS-3 | Yes | 120 | CC-46 |
| Ex. 63 | SA-14 | AS-4 | No | >120 | CC-47 |
| Ex. 64 | SA-14 | AS-5 | Yes | 150 | CC-48 |
| Ex. 65 | SA-14 | AS-6 | No | >120 | CC-49 |
| Ex. 66 | SA-14 | AS-7 | Yes | 23 | CC-50 |
| Ex. 67 | SA-15 | AS-1 | Yes | 120 | CC-51 |
| Ex. 68 | SA-15 | AS-2 | Yes | 45 | CC-52 |
| Ex. 69 | SA-15 | AS-3 | Yes | 23 | CC-53 |
| Ex. 70 | SA-15 | AS-4 | No | >120 | CC-54 |
| Ex. 71 | SA-7 | AS-1 | Yes | 23 | CC-55 |
| Ex. 72 | SA-7 | AS-2 | Yes | 23 | CC-56 |
| Ex. 73 | SA-7 | AS-3 | Yes | 120 | CC-57 |
| Ex. 74 | SA-7 | AS-4 | No | >120 | CC-58 |
| Ex. 75 | SA-8 | AS-1 | Yes | 70 | CC-59 |
| Ex. 76 | SA-8 | AS-2 | No | >120 | CC-60 |
| Ex. 77 | SA-8 | AS-3 | No | >120 | CC-61 |
| Ex. 78 | SA-8 | AS-4 | No | >120 | CC-62 |
| Comp. Ex. 4 | EA-3 | AS-1 | No | >120 | CC-63 |
| Comp. Ex. 5 | EA-3 | AS-2 | No | >120 | CC-64 |
| Comp. Ex. 6 | EA-3 | AS-3 | No | >120 | CC-65 |
| Comp. Ex. 7 | EA-3 | AS-4 | Yes | 23 | CC-66 |

Examples 79-93 and Comparative Example 8: Aminosiloxane-Crosslinked Copolymers

Aminosiloxane-crosslinked copolymers are prepared according to General Procedure 2 above, using various curable compositions prepared in the Examples above to give Examples 79-93 and Comparative Example 8. In particular, select curable compositions are heated to and held at a curing temperature of 150° C. The curing compositions are monitored via Tilt Test until cured, and the cure times recorded. The particular curable compositions and cure times of Examples 79-93 and Comparative Example 8 are set forth in Table 9 below.

TABLE 9

Curing Performance of Select Copolymers

| Example | Curable Composition | Cure Time (min) |
|---|---|---|
| Ex. 79 | CC-1 | 7 |
| Ex. 80 | CC-4 | 5 |
| Ex. 81 | CC-13 | 8 |
| Ex. 82 | CC-17 | 5 |
| Ex. 83 | CC-21 | 3 |
| Ex. 84 | CC-25 | 10 |
| Ex. 85 | CC-29 | 17 |
| Ex. 86 | CC-33 | 13 |
| Ex. 87 | CC-39 | 13 |
| Ex. 88 | CC-40 | 6 |
| Ex. 89 | CC-44 | 4 |
| Ex. 90 | CC-48 | 60 |
| Ex. 91 | CC-50 | 3 |
| Ex. 92 | CC-51 | 60 |
| Ex. 93 | CC-55 | 5 |
| Ex. 94 | CC-59 | 1 |
| Comp. Ex. 8 | CC-66 | 2 |

What is claimed is:

1. A curable composition, comprising:
(I) an epoxide-functional silicone-acrylate polymer having the following general unit formula:

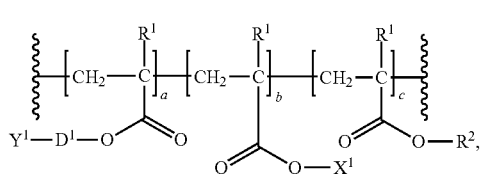

wherein: each $R^1$ is independently selected from H and $CH_3$; each $R^2$ is an independently selected substituted or unsubstituted hydrocarbyl group; each $D^1$ is a divalent linking group; each $Y^1$ is an independently selected siloxane moiety; each $X^1$ is an independently selected epoxide-functional moiety; subscript $a \geq 1$; subscript $b \geq 1$; subscript $c \geq 0$; and units indicated by subscripts a, b, and c may be in any order in the silicone-acrylate polymer; and (II) an aminosiloxane comprising an average of at least two amine functional groups per molecule.

2. The curable composition of claim 1, wherein in the epoxide-functional silicone-acrylate polymer (I) at least one siloxane moiety $Y^1$ comprises a siloxane group having general formula $—Si(R^3)_3$, where each $R^3$ is independently selected from $R^4$ and $—OSi(R^5)_3$, with the proviso that at least one $R^3$ is $—OSi(R^5)_3$; where each $R^5$ is independently selected from $R^4$, $—OSi(R^6)_3$, and $—[—D^2—SiR^4_2]_mO-SiR^4_3$; where each $R^6$ is independently selected from $R^4$, $—OSi(R^7)_3$, and $—[—D^2—SiR^4_2]_mOSiR^4_3$; where each $R^7$ is independently selected from $R^4$ and $—[—D^2—SiR^4_2]_mOSiR^4_3$; where $0 \leq m \leq 100$; where each $D^2$ is a divalent linking group; and where each $R^4$ is independently a substituted or unsubstituted hydrocarbyl group.

3. The curable composition of claim 2, wherein in the epoxide-functional silicone-acrylate polymer (I): (i) each $R^3$ is $—OSi(R^5)_3$; (ii) each $R^4$ is methyl; (iii) at least one $R^5$ is $—OSi(R^6)_3$ or $—[—D^2—SiR^4_2]_mOSiR^4_3$; (iv) each $D^2$ is independently O or ethylene; or (v) any combination of (i)-(iv).

4. The curable composition of claim 1, wherein in the epoxide-functional silicone-acrylate polymer (I) at least one siloxane moiety $Y^1$ comprises a siloxane group having the following general formula:

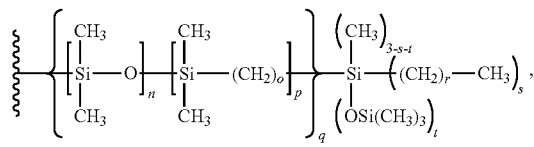

where $0 \leq n \leq 100$, subscript o is from 2 to 6, subscript p is 0 or 1, subscript q is 0 or 1, subscript r is from 0 to 9, subscript s is 0 or 1, and subscript t is 0 or 2, with the provisos that subscript t is 0 when subscript s is 1, and subscript t is 2 when subscript s is 0.

5. The curable composition of claim 1, wherein in the epoxide-functional silicone-acrylate polymer (I) each siloxane moiety $Y^1$ is independently a siloxane group having one of the following formulas (i)-(vii):

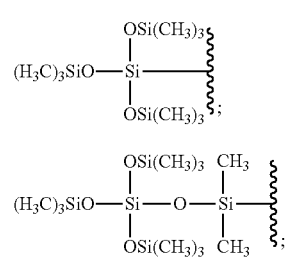

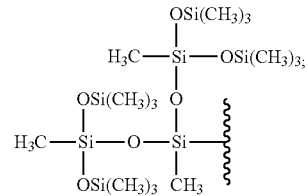

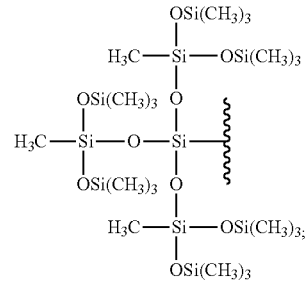

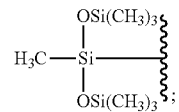

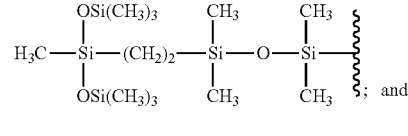

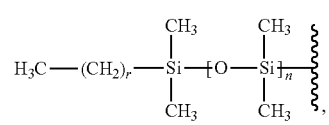

where $1 < n \leq 100$ and subscript r is from 3 to 9.

6. The curable composition of claim 1, wherein in the epoxide-functional silicone-acrylate polymer (I) each divalent linking group $D^1$ comprises: (i) an independently selected linear alkylene group having from 2 to 6 carbon atoms; (ii) a tertiary amino group; or (iii) both (i) and (ii).

7. The curable composition of claim 1, wherein in the epoxide-functional silicone-acrylate polymer (I): (i) $R^1$ is $CH_3$ in each moiety indicated by subscript a; (ii) $R^1$ is $CH_3$ in each moiety indicated by subscript b; (iii) $R^1$ is H in each moiety indicated by subscript c; (iv) each $R^2$ is butyl; (v) each $X^1$ is an epoxypropyl group of formula

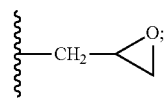

(vi) subscript b is comprises at least 30% of the total units indicated by subscripts a, b, and c; or (vii) any combination of (i)-(vi).

8. The curable composition of claim 1, wherein the aminosiloxane (II) has the general average unit formula $[R^8_iSiO_{(4-i)/2}]_h$, where: subscript $h \geq 1$; subscript i is independently selected from 1, 2, and 3 in each moiety indicated by subscript h, with the proviso that $h+i>2$; and each $R^8$ is independently selected from hydrocarbyl groups, alkoxy and/or aryloxy groups, siloxy groups, and amine groups, with the proviso that an average of at least two $R^8$ are amine groups per molecule.

9. The curable composition of claim 1, wherein the aminosiloxane (II) has the following general formula:

$$[R^{10}R^9{}_2SiO_{1/2}]_x[R^{10}R^9SiO_{2/2}]_y[R^{10}SiO_{3/2}]_z,$$

where each $R^9$ is an independently selected hydrocarbyl group; each $R^{10}$ is independently $R^9$ or an amino-functional hydrocarbon group, with the proviso that the aminosiloxane (II) comprises an average of at least two $R^{10}$ that are amino-functional hydrocarbon groups per molecule; and subscripts x, y, and z are each mole fractions such that x+y+z=1, with the provisos that 0≤x<1, 0<y<1, and 0<z<1.

10. The curable composition of claim 9, wherein: (i) each $R^9$ is $CH_3$; (ii) each amino-functional hydrocarbon group $R^{10}$ is an alkylamine having from 1 to 10 carbon atoms; (iii) subscript z is 0; (iv) the aminosiloxane (II) has a degree of polymerization of from 5 to 100; (v) the aminosiloxane (II) is miscible with the epoxide-functional silicone-acrylate polymer (I); or (vi) any combination of (i)-(v).

11. A method of preparing the curable composition of claim 1, said method comprising:
reacting (A) an acryloxy-functional organosilicon component, (B) an epoxy-functional acrylate component, and optionally (C) an acrylate component, to give the epoxide-functional silicone-acrylate polymer (I); and
combining the epoxide-functional silicone-acrylate polymer (I) and the aminosiloxane (II) to give the curable composition;
wherein the acryloxy-functional organosilicon component (A) comprises an acryloxy-functional organosilicon monomer having the general formula:

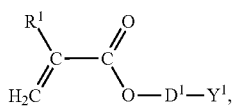

the epoxy-functional acrylate component (B) comprises an oxiranyl acrylate ester monomer having the general formula:

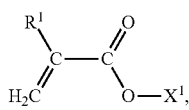

and the optional acrylate component (C) comprises an acrylic ester monomer having the general formula:

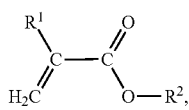

where each $R^1$, $R^2$, $D^1$, $Y^1$, and $X^1$ is independently selected and as defined above.

12. The method of claim 11, wherein the acryloxy-functional organosilicon component (A) comprises an acryloxy-functional organosilicon monomer;
(i) $R^1$ is $CH_3$;
(ii) $D^1$ comprises an independently selected linear alkylene group having from 2 to 6 carbon atoms, optionally substituted with an alkyl amino group;

(iii) $Y^1$ comprises a siloxane group having general formula -Si $(R^3)$ 3, where each $R^3$ is independently selected from $R^4$ and -OSi $(R^5)$ 3, with the proviso that at least one $R^3$ is —OSi$(R^5)_3$; where each $R^5$ is independently selected from $R^4$, —OSi$(R^6)_3$, and —[—$D^2$—Si$R^4{}_2]_m$OSi$R^4{}_3$; where each $R^6$ is independently selected from $R^4$, —OSi$(R^7)_3$, and —[—$D^2$—Si$R^4{}_2]_m$OSi$R^4{}_3$; where each $R^7$ is independently selected from $R^4$ and —[—$D^2$—Si$R^4{}_2]_m$OSi$R^4{}_3$; where 0≤m≤100; where each $D^2$ is a divalent linking group; and where each $R^4$ is independently a substituted or unsubstituted hydrocarbyl group; or (iv) $Y^1$ comprises a siloxane group having the following general formula:

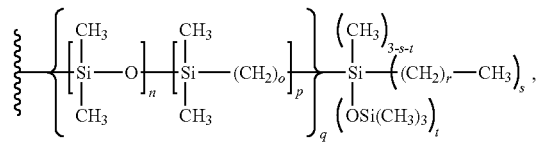

where 0<n≤100, subscript o is from 2 to 6, subscript p is 0 or 1, subscript q is 0 or 1, subscript r is from 0 to 9, subscript s is 0 or 1, and subscript t is 0 or 2, with the provisos that subscript t is 0 when subscript s is 1, and subscript t is 2 when subscript s is 0;
(v) any combination of (i)-(iii); or
(vi) any combination of (i), (ii), and (iv).

13. The method of claim 11, wherein in the oxiranyl acrylate ester monomer of the epoxy-functional acrylate component (B): (i) $R^1$ is $CH_3$; (ii) $X^1$ is an epoxypropyl group of formula

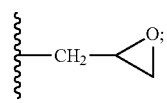

or (iii) both (i) and (ii).

14. The method of claim 11, wherein the acryloxy-functional organosilicon component (A) and the epoxy-functional acrylate component (B) are reacted in the presence of the acrylate component (C), and wherein in the acrylic ester monomer of the acrylate component (C): (i) $R^1$ is H; (ii) $R^2$ is butyl; or (iii) both (i) and (ii).

15. The method of claim 11, wherein: (i) the acryloxy-functional organosilicon component (A) comprises at least two different acryloxy-functional organosilicon monomers, each corresponding to the general formula above; (ii) the acryloxy-functional organosilicon component (A) and the epoxy-functional acrylate component (B) are reacted in the presence of the acrylate component (C), and the acrylate component (C) comprises at least two different acrylic ester monomers, each corresponding to the general formula above; or (iii) both (i) and (ii).

16. The method of claim 11, wherein the acryloxy-functional organosilicon component (A) and the epoxy-functional acrylate component (B) are reacted in the presence of: (D) a free radical initiator; (E) a solvent; (F) a chain-transfer agent; or any combination of components (D)-(F).

17. The method of claim 16, wherein the acryloxy-functional organosilicon component (A) and the epoxy-functional acrylate component (B) are reacted in the presence of the chain-transfer agent (F), and wherein the chain-transfer agent (F) comprises: (i) a thiol compound having the general formula X-SH, where X is selected from substituted and unsubstituted hydrocarbon moieties, organosilicon moieties, and combinations thereof; (ii) $(H_3CO)_2(H_3C)Si(CH_2)_3SH$; (iii) dodecane thiol; or (iv) any combination of (i)-(iii).

18. A cured product of the curable composition of claim 1.

19. A method of preparing an aminosiloxane-silicone-acrylate copolymer, said method comprising:
   providing the curable composition of claim 1; and
   heating the curable composition, to give the aminosiloxane-silicone-acrylate copolymer.

20. An aminosiloxane-silicone-acrylate copolymer, wherein the aminosiloxane-silicone-acrylate copolymer is prepared from the curable composition of claim 1.

* * * * *